Oct. 29, 1968          J. W. BUSBY          3,408,482
MACHINE FOR SEQUENTIALLY SCANNING LINES, AS IN TEST SCORING
Filed July 5, 1962                    9 Sheets-Sheet 1
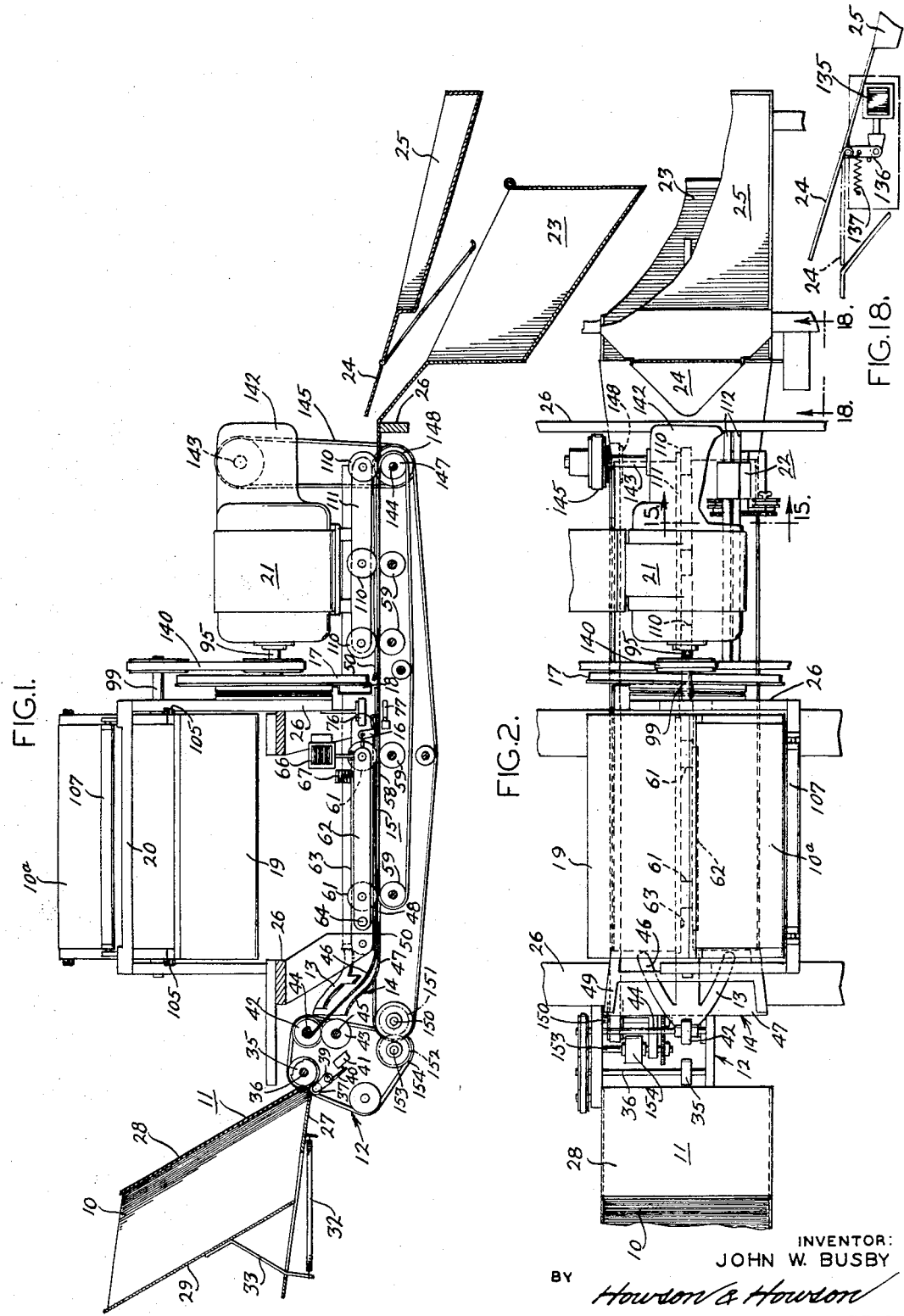
INVENTOR:
JOHN W. BUSBY
BY
Howson & Howson
ATTYS.

Oct. 29, 1968  J. W. BUSBY  3,408,482
MACHINE FOR SEQUENTIALLY SCANNING LINES, AS IN TEST SCORING
Filed July 5, 1962  9 Sheets-Sheet 2
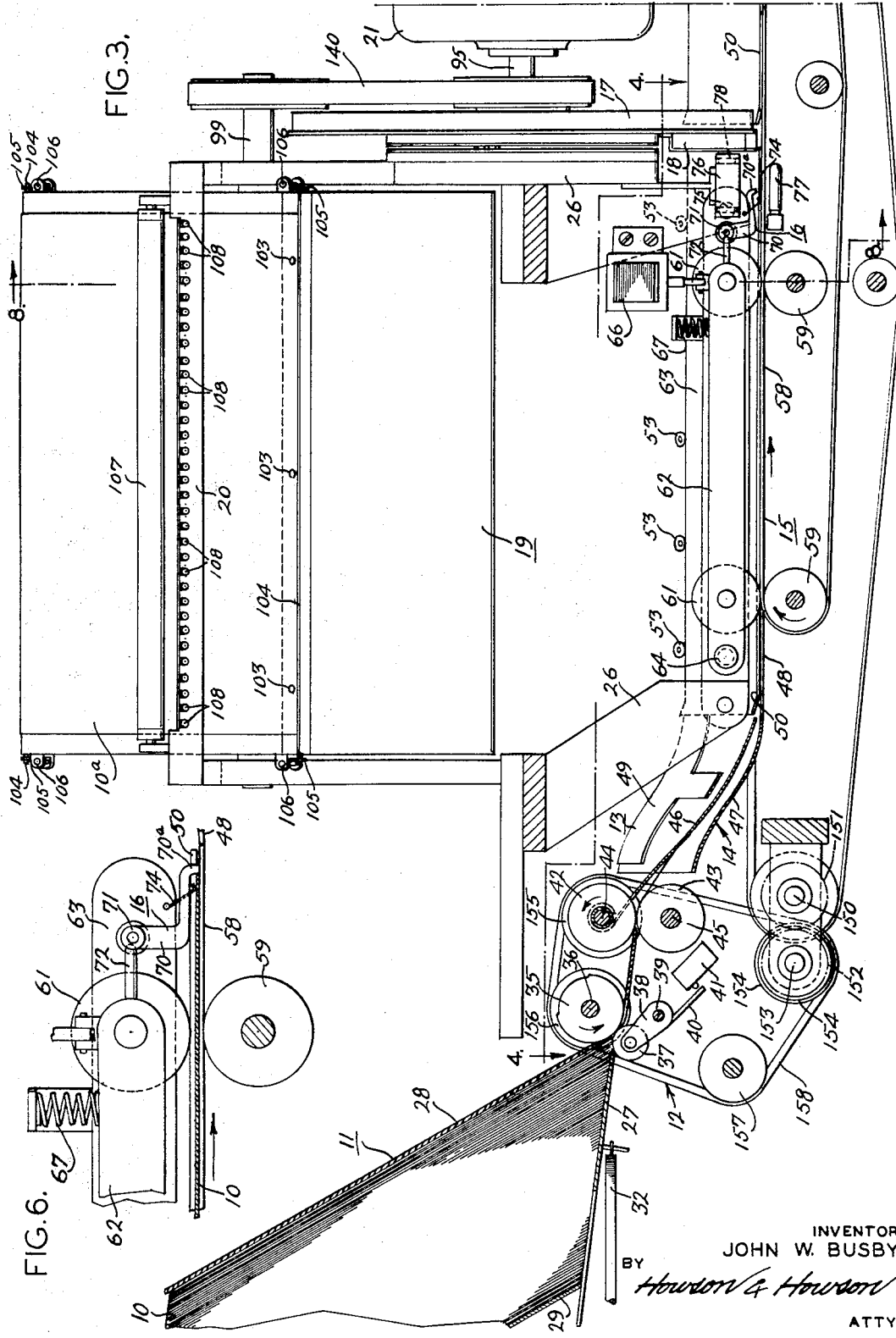
INVENTOR:
JOHN W. BUSBY
BY
Howson & Howson
ATTYS.

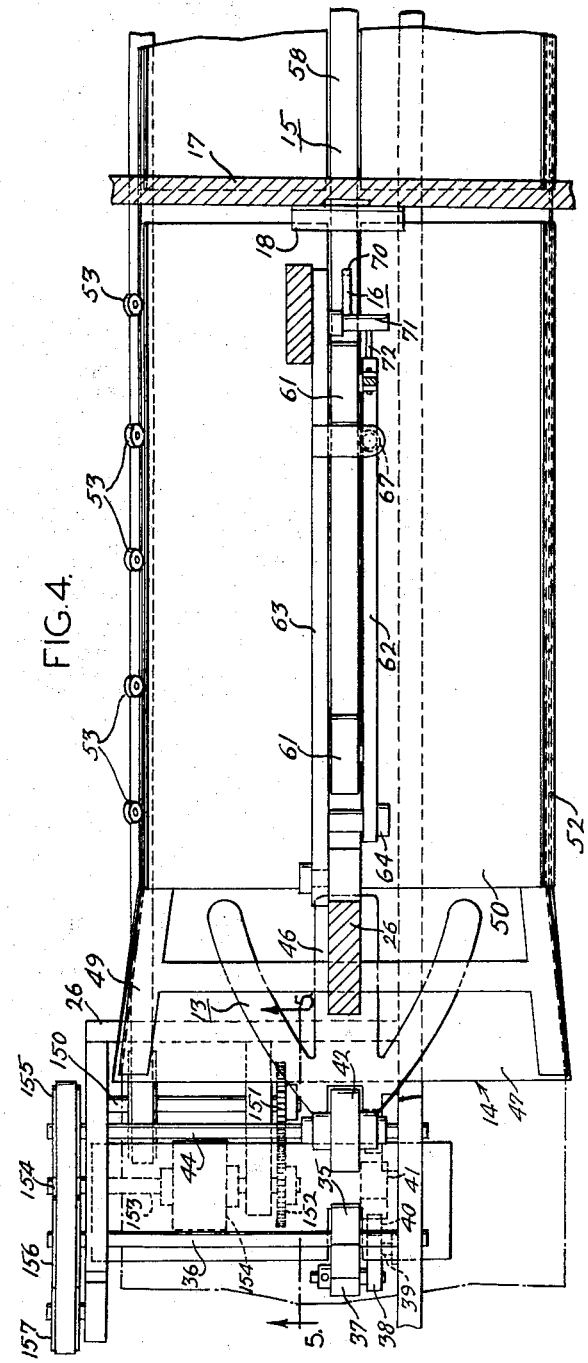
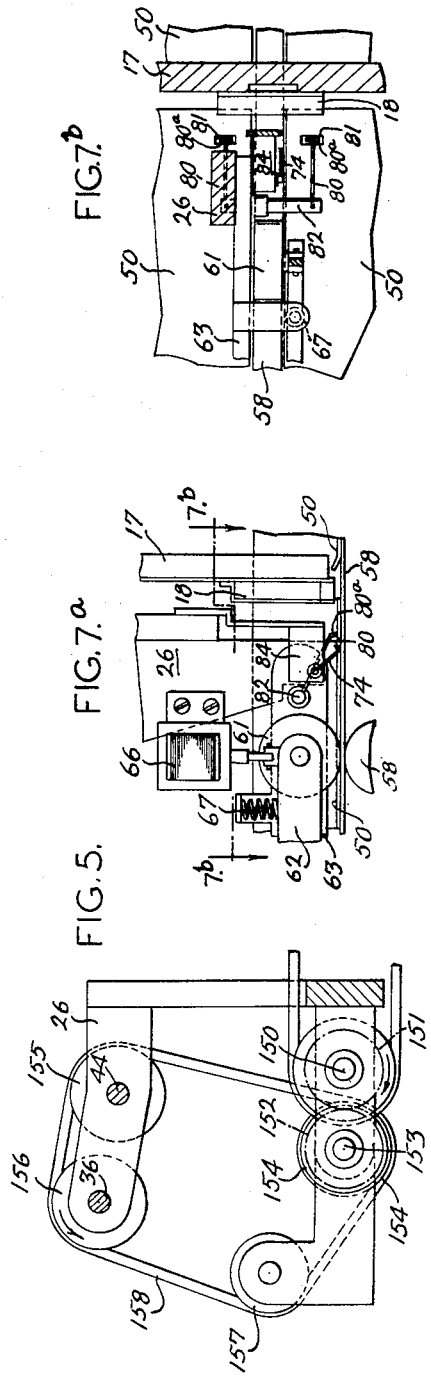

Oct. 29, 1968  J. W. BUSBY  3,408,482
MACHINE FOR SEQUENTIALLY SCANNING LINES, AS IN TEST SCORING
Filed July 5, 1962  9 Sheets-Sheet 4
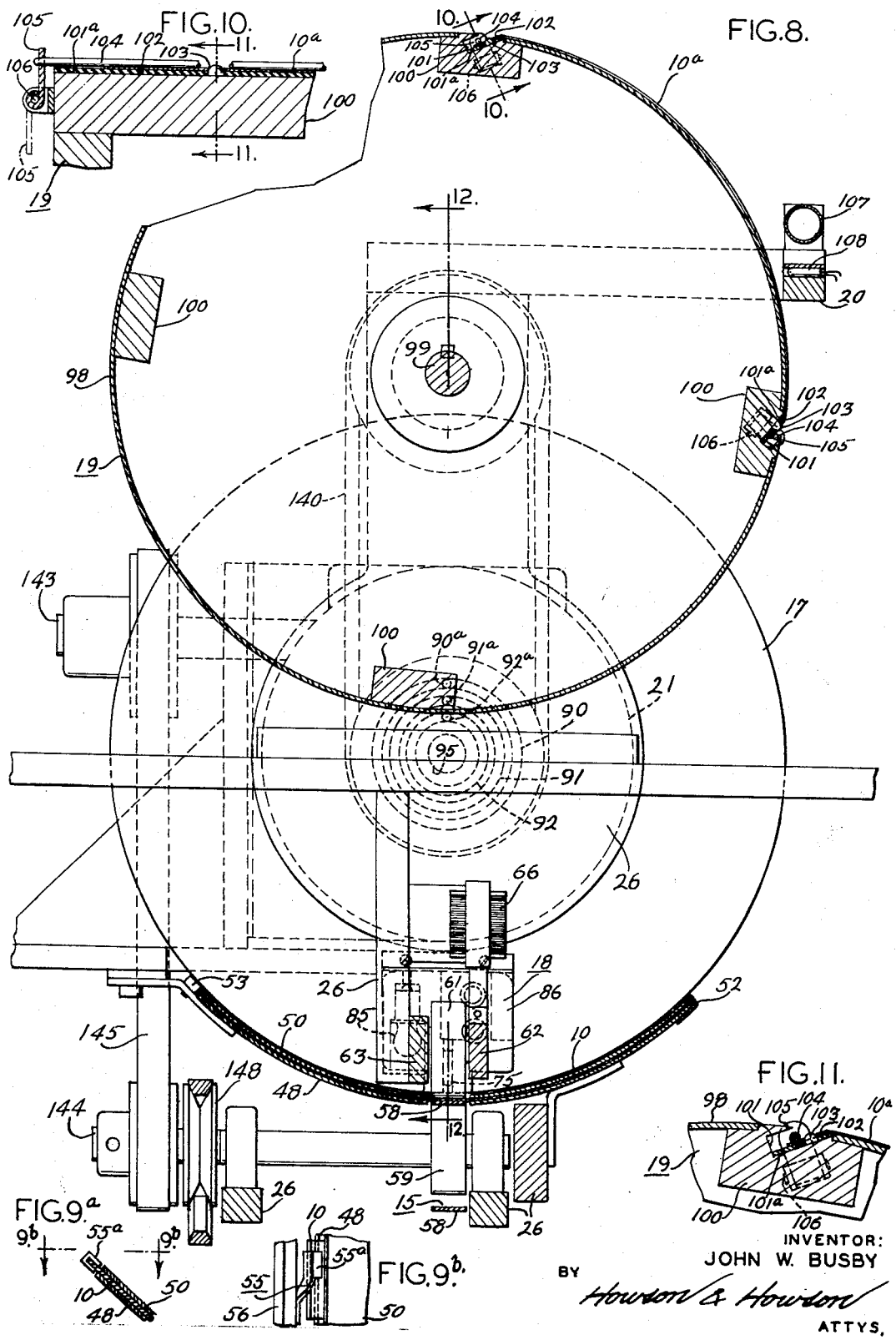
INVENTOR:
JOHN W. BUSBY
BY Howson & Howson
ATTYS.

INVENTOR:
JOHN W. BUSBY
BY Howson & Howson
ATTYS.

Oct. 29, 1968 J. W. BUSBY 3,408,482
MACHINE FOR SEQUENTIALLY SCANNING LINES, AS IN TEST SCORING
Filed July 5, 1962 9 Sheets-Sheet 6
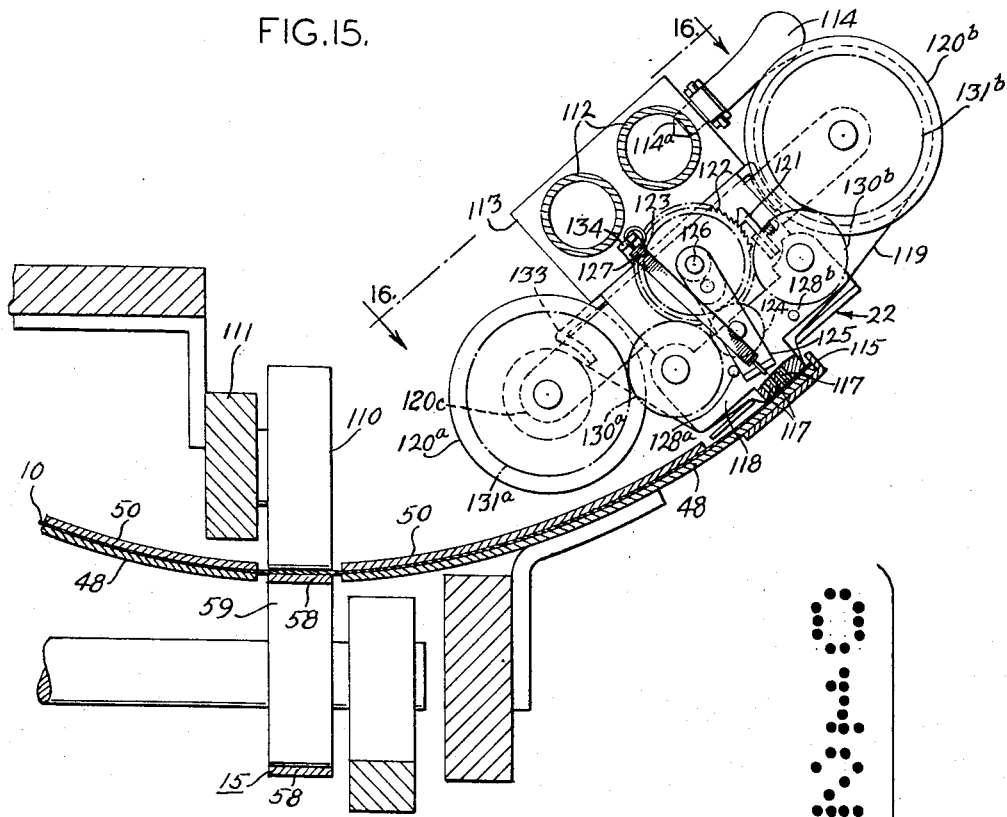
FIG.15.
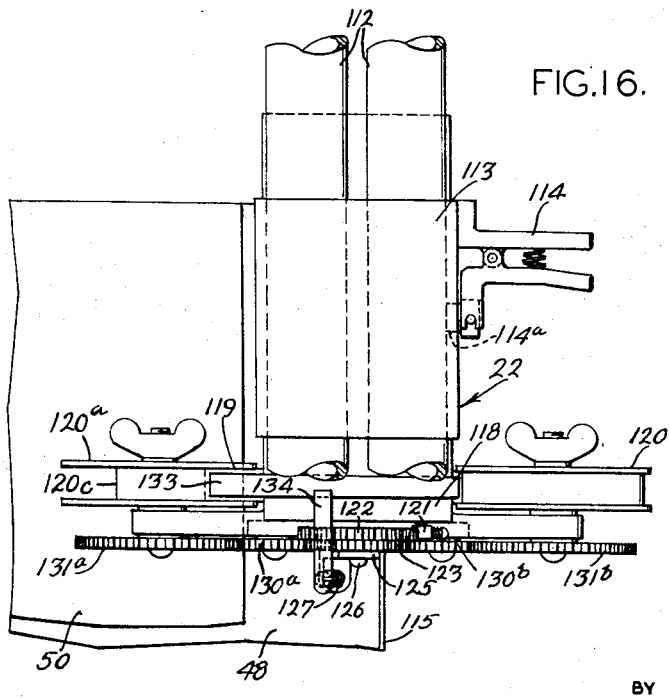
FIG.16.
FIG.17.
INVENTOR:
JOHN W. BUSBY
BY Howson & Howson
ATTYS.

Oct. 29, 1968 J. W. BUSBY 3,408,482
MACHINE FOR SEQUENTIALLY SCANNING LINES, AS IN TEST SCORING
Filed July 5, 1962 9 Sheets-Sheet 7

INVENTOR:
JOHN W. BUSBY
BY Howson & Howson
ATTYS.

Oct. 29, 1968  J. W. BUSBY  3,408,482
MACHINE FOR SEQUENTIALLY SCANNING LINES, AS IN TEST SCORING
Filed July 5, 1962  9 Sheets-Sheet 8
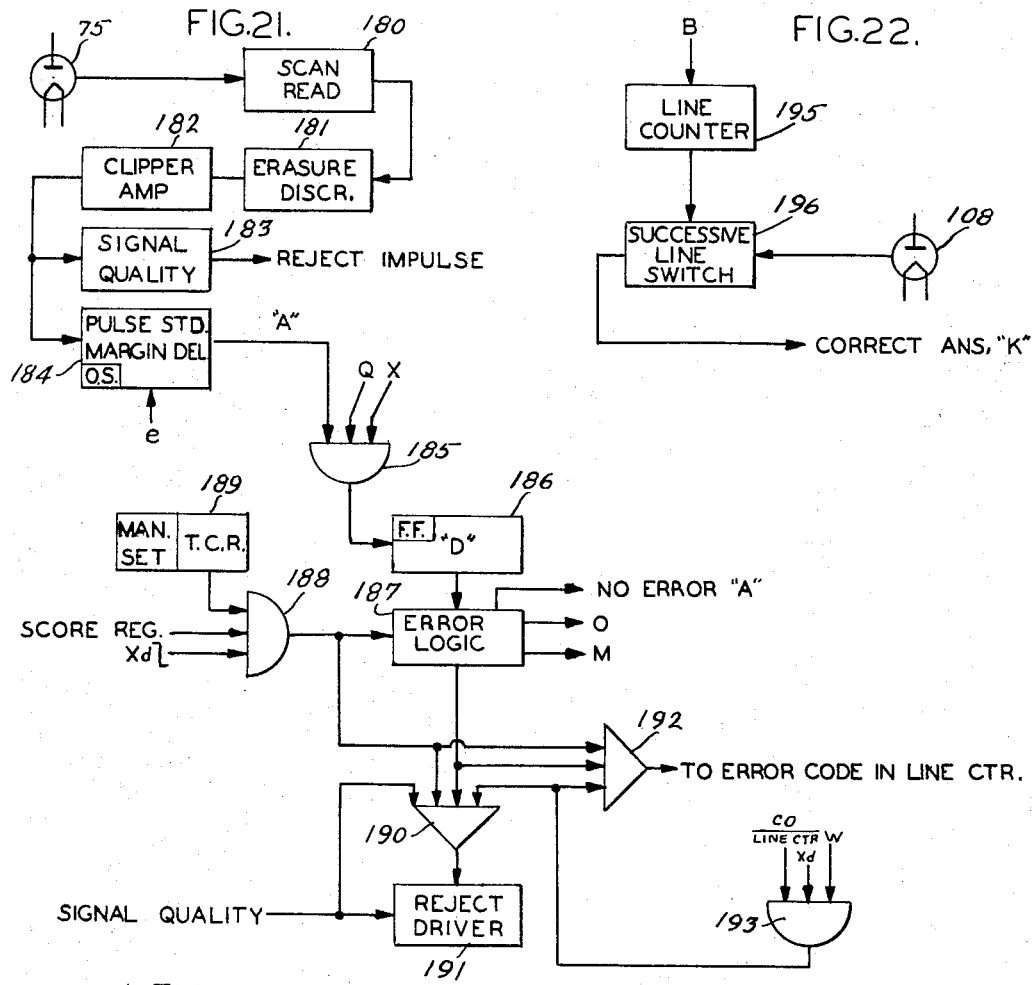
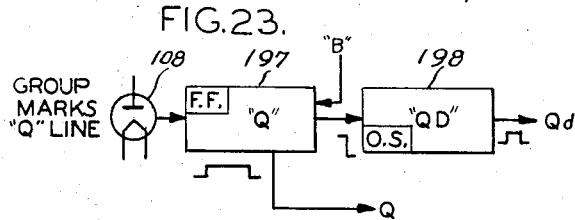
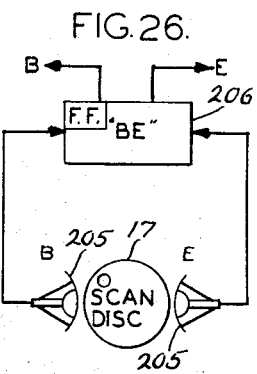
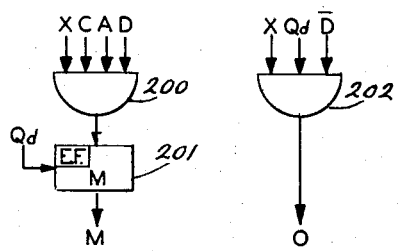
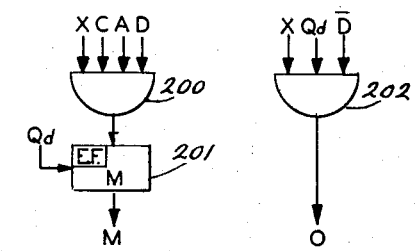
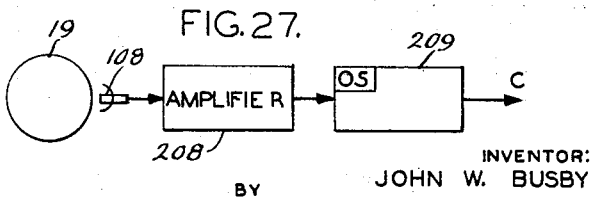
INVENTOR:
JOHN W. BUSBY
BY Howson & Howson
ATTYS.

3,408,482
MACHINE FOR SEQUENTIALLY SCANNING
LINES, AS IN TEST SCORING
John W. Busby, Levittown, N.J., assignor to Optical
Scanning Corporation, a corporation of Pennsylvania
Filed July 5, 1962, Ser. No. 207,607
56 Claims. (Cl. 235—61.7)

ABSTRACT OF THE DISCLOSURE

Data in the form of contrasting markings in critical locations on a surface of successive pieces, such as pencilled answer marks in selected multiple choice positions on test answer sheet papers, are extracted by a machine which provides rotatable pickup means for optically scanning selected lines on each piece and conveyor means for moving the successive pieces past the pickup means. A common drive means assures proper relative speeds of the conveyor and the scanning means so that each selected line on the sheet will be scanned and preferably the axis of the scanning means is slightly canted so that scanning is essentially perpendicular to the direction of movement. Indexing means referencing on some predetermined part of each piece cause the selected lines on each piece to assume proper position relative to the scanning member as by intermittent feeding of the pieces onto the portion of the conveyor passing the scanning. Comparison may be made with a standard which is also optically scanned and corresponding data compared. Logic may be provided for such comparison on a variety of selected bases and results of the comparison may be accumulated and even printed out on the piece.

---

This invention relates to a machine for sequentially scanning lines on a surface and more particularly to a machine for scanning across successive rows to detect marks of some predetermined type in those rows.

The machine of the present invention is particularly adapted for scanning successive lines or rows on sheets of paper or other material which has been specifically designed to provide significant marks only in the specific horizontal rows scanned. The machine was devised for scanning answer sheets of a standard stylized form in which a plurality of answer positions, usually in the form of narrow rectangular vertically oriented boxes are provided in a rectangular matrix of regular rows, of which some or part of some may be omitted in a given situation. Groups of boxes along a given row may be designated as providing alternative possible answers to a particular question and selection of a particular answer is accomplished by marking a vertical pencil line in the box representing the answer selected. When used as a test scoring machine, marks of this nature on an answer sheet are compared with marks on a score key having corresponding arrangement with marks in those positions representing correct answers only. Suitable comparison means may then be used to compare the successive lines on the score key and answer sheet and by suitable electrical circuitry arrive at a score.

Answer sheet scoring machines have been produced heretofore only at great expense and have involved techniques other than the specific type of scanning employed herein. The techniques employed have been more expensive to apply and the machines, even without the elaborate choice of scoring possibilities afforded by the machine of the present invention, have been extremely complicated and very expensive. A principal object of the present invention is to produce a relatively low cost test scoring machine which will make it economical to use machine scoring on a much wider basis than has heretofore been possible.

In accordance with the present invention, a scanning member including a scanning pickup element is rotatably supported on a frame. Conveyor means is provided on the frame substantially parallel to the axis of rotation of the rotatable scanning member for moving material past the scanning member at such a rate that the pickup will pass successive lines or rows on the material being scanned one at a time. Suitable means is provided so that the scanning member and the conveyor are driven at proper relative speeds in order to assure that the lines desired to be scanned, and not intermediate lines, are scanned.

Preferably the material to be scanned is formed so that the surface scanned is a segment of a cylindrical surface having an axis essentially coinciding with the axis of rotation of the scanning member. In the usual case, this requires suitable supporting members and possibly guiding members to assure proper positioning. Preferably, the axis of rotation of the scanning member and the axis of the cylindrical segment diverge slightly in such direction as to produce a canting of the scanning member. The amount of canting is calculated such that scanning will progress across a row essentially perpendicular to the direction of movement despite the movement of the material.

The device described thus far can, of course, be used for scanning of materials without regard to the nature of the material and without regard to how the information acquired in the scanning is to be used. As previously suggested, the device of the present invention lends itself particularly well to a test scoring device and, in that event, a score key pickup arrangement must be provided. In addition to correct answers the key serves three additional functions: a clocking function by means of a clock track of marks indicating horizontal distribution of response positions on a line; a question interval defining function defining consecutive response positions belonging to each question; a vertical partition function for vertically dividing the answer sheet into parts using a partition column of mark positions at the end of each line on the key. The means for scanning the lines of the score key are preferably a plurality of pickup means arranged in fixed position relative to a score key drum or cylinder so that the lines to be scanned repetitively pass the same scanning element. Switching means to sequentially select the correct pickup means for scanning the line corresponding to that being scanned on the answer sheet makes it possible for simultaneous direct comparison to be made of each correct answer and the answer selected on the answer sheet.

Logic systems of varying complexity may be employed. At the minimum, the logic system compares signals from the score key and from the answer sheet and indicates when correct answers have been marked. In addition, by the system hereinafter described, it is possible to detect wrong answers, multiple answers for a particular question, omitted answers for a particular question and to combine wrong answers, multiple answers and/or omitted answers as selected. The wrong answers may then be subjected to division by a selected factor and the resulting quotient may be subtracted from the right answers. Preferably, the total score is fed through printing logic which actuates a printer to print out the score or partial score on the answer sheet before it leaves the machine.

There are specific areas of novelty in the particular type of pickup means, in the conveyor system, in the printing system, in the guiding system, in the specific logic systems employed, and elsewhere as will appear hereinafter.

For a better understanding of the present invention reference is made to the following drawings in which preferred embodiments of a test scoring machine, including circuitry, embodying the present invention and a typical answer sheet and a typical score key are illustrated:

FIG. 1 is a side elevational view partially in vertical section showing the machine;

FIG. 2 is a plan view from above of the device of FIG. 1;

FIG. 3 is an enlarged view of a portion of FIG. 1 showing elements of the structure in greater detail;

FIG. 4 is a sectional view taken along line 4—4 of FIG. 3;

FIG. 5 is a sectional view taken along line 5—5 of FIG. 4;

FIG. 6 is a detail view of the paper control gate seen in FIG. 3;

FIG. 7a is a detail showing a modified form of the paper gate shown in FIG. 6;

FIG. 7b is a sectional view taken along line 7b—7b of FIG. 7a;

FIG. 8 is a sectional view taken along line 8—8 of FIG. 3;

FIG. 9a is a detail showing a modified form of paper guide useful in the place of that shown in FIG. 8;

FIG. 9b is a sectional view taken along line 9b—9b of FIG. 9a;

FIG. 10 is a sectional view taken along line 10—10 of FIG. 8;

FIG. 11 is a sectional view taken along line 11—11 of FIG. 10;

FIG. 14b is a sectional view taken along line 14b—14b of FIG. 14a;

FIG. 15 is a sectional view taken along line 15—15 of FIG. 2;

FIG. 16 is a sectional view taken along line 16—16 of FIG. 15;

FIG. 17 is a diagrammatic view representing numerical dot matrix characters printed by the printer of FIGS. 15 and 16;

FIG. 18 is a detailed sectional view taken along line 18—18 of FIG. 2;

FIG. 21 is a logic diagram of circuitry used in this test scoring machine for error detection;

FIG. 22 is a logic diagram of the score key line selection circuitry;

FIG. 23 is a logic diagram of the group selection circuitry;

FIG. 24 is a logic diagram of "and" gate error logic used in circuitry for sorting multiple answers;

FIG. 25 is a similar "and" gate error logic used in sorting omitted answers;

FIG. 26 is the scan disc logic diagram for sorting B and E intervals;

FIG. 27 is the clock signal circuit;

Although it will be immediately clear to those skilled in the art that certain aspects of the present invention are not limited to a test scoring machine and have not been so limited by the claims, for a better understanding of the invention all of its aspects are illustrated in terms of the test scoring machine.

Figure 19:
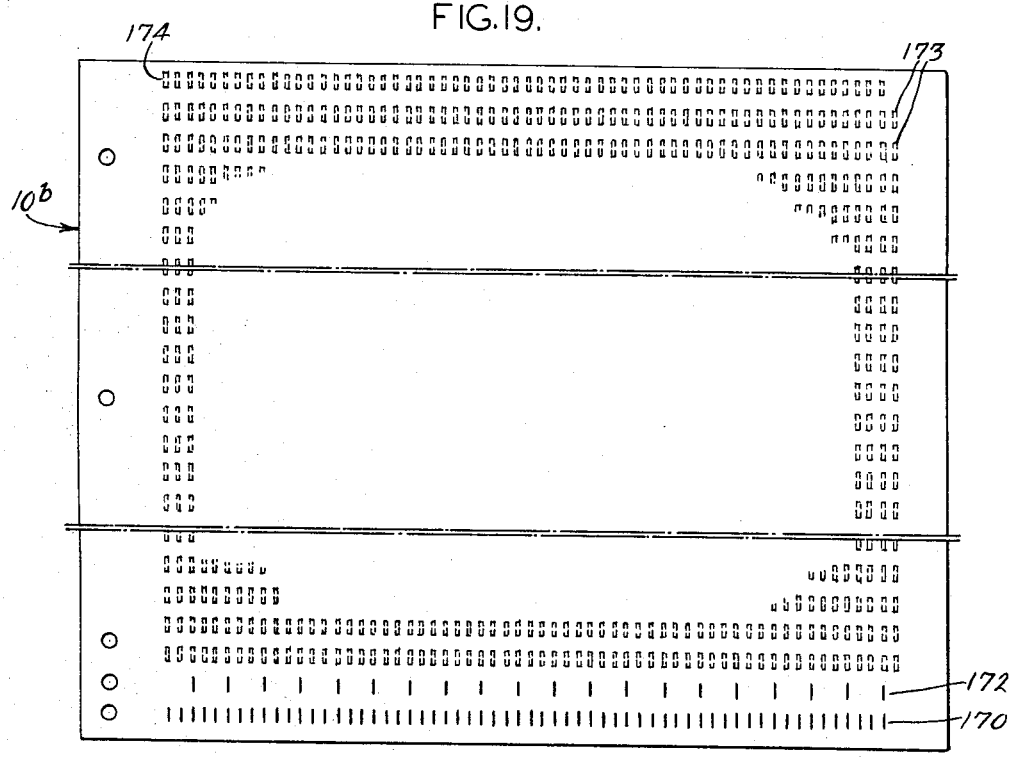
FIG. 19 is a foreshortened view of the printed side of a score key used in connection with the test scoring device of the present invention.
Figure 20:
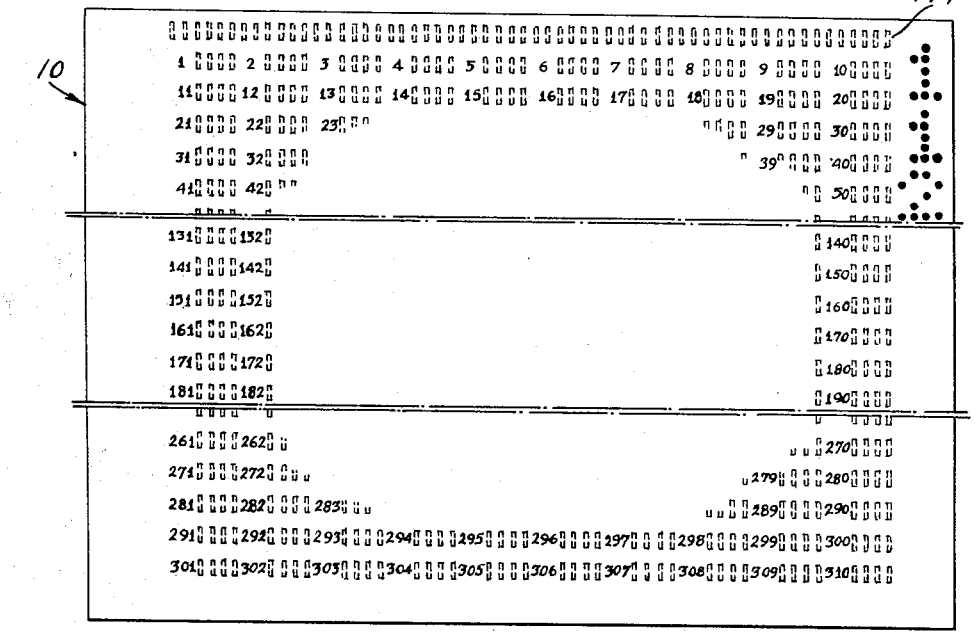
FIG. 20 is a similar view of the printed side of a test answer sheet with which the scoring device of the present invention is useful.

The purpose of the test scoring machine is to grade test answer sheets such as that shown in FIG. 20. Each sheet 10 has printed on it in a special low carbon ink answer boxes in a pattern of rows and columns. The answer boxes are normally grouped into groups of as many boxes as there are possible answers, and each group is numbered with the number of the question of the test for which it is provided. The box representing the number of the correct answer for each question in a group is blacked in by a vertical pencil line and other boxes are left blank. This answer sheet is compared against a master score key, such that one 10b shown in FIG. 19, which has columns and rows of boxes corresponding to those on the answer sheet. The score key has those boxes representing correct answers marked with a pencil line similarly to the boxes representing selected answers on the answer sheet. Since the score key is marked with the correct answers, a box on the answer sheet marked with an answer which corresponds to a correct answer marked on the score key will be compared by the machine of the present invention and counted. Depending upon the electronic logic selected the machine can detect and score in various ways wrong, multiple and omitted answers. The score, and in some instances partial scores, may be printed out in the margin of the answer sheet as indicated in the upper right-hand corner of the answer sheet shown in FIG. 20.

Referring now to FIGS. 1 and 2, the overall mechanical structure of the test scoring machine may be seen. Answer sheets to be graded are sorted so that they will all be top down and side to be graded to the right in the feed hopper 11. Appropriate sheet selector means, generally designated 12, draws the sheets from the hopper one at a time and feeds them into the paper shaping portion 13 of guide structure 14. The answer sheet is then drawn along guide 14 by conveyor means 15 until stopped at gate 16 just prior to the scanning disc 17. The scanning disc 17 is a rotatable element which carries pickup element 18 which sequentially scans the rows on the test answer sheet. The score key 10a is fixed to drum 19 and its rows are continuously scanned by a plurality of pickups in strip 20 which are arranged so that each pickup scans one row of information on the score key each evolution. Driving the score key drum 19, scanning disk 17 and all other moving elements of the system is drive motor 21 which in some cases drives directly and in others drives through reduction gear takeoff. After the scanning of each answer sheet is completed, the paper is fed past printer 22 which prints the score on each answer paper prior to its falling into hopper 23. However, if the logic circuitry prevents a score from being recorded for some reason, diverter means 24 is lowered and the rejected unscored sheet is passed in tray 25.

It will be appreciated that a suitable supporting frame is required for the structure but that for the sake of clarity much of the support structure has been omitted so that the essential mechanism may be seen. In a practical embodiment part of the frame is a table which supports the machine at a comfortable working height for the operator and provides cabinets and racks for the electronics beneath the table top. Hereafter all parts of the frame or supporting structure are designated 26.

As best seen in FIG. 1 the hopper 11 into which answer sheets are initially placed is provided with a slotted bottom 27 sloping slightly downward toward the sheet selector. The front wall 28 against which the answer sheets are held is sharply inclined to the bottom with which it forms an acute angle, but is separated from the bottom by a gap which is extended some distance up the front to permit a friction contact roll 35 to engage and withdraw individual answer sheets from the hopper. The back 29 is generally parallel to the front 28 but slideable on the bottom 27 and urged in that direction by spring member 32 connected to bracket 33 which extends through a slot in bottom 27. The hopper, for example, might hold 500 answer sheets.

As seen in FIGS. 3, 4 and 5 friction roll 35 is supported on shaft 36 suitably journalled in parts of the frame 26 which also serve to support the hopper 11. Shaft 36 and roll 35 are driven in a manner which will be described hereafter. As can be seen in FIG. 3, the sheet selector roller 35 has a non-uniform radius. The roller is so-positioned that the larger radius portion bears against the first answer sheet stacked in the hopper through a slot at the bottom of the front wall 28. The rotation of the roller is such that the frictional contact of the larger radius portion tends to draw the sheet downward and to the right as viewed in FIG. 3 between the roller 35 and the idler roller 37. Idler roller 37 is rotatably supported on an arm 38 which is pivoted about pin 39 and has an extension 40 which actuates a microswitch 41 in the event that the thickness of material passing between roller 35 and idler 37 exceeds that of a single answer sheet. After passing roller 35 the paper enters the nip between pull out rollers 42 and 43. Roller 42 is rotatably driven by its supporting shaft 44 whereas roller 43 is an idler supported on shaft 45. Paper fed into the nip between these rollers is drawn between them and beneath shaping guide 46, whose ends are supported on shaft 44 (see FIG. 4). The paper is supported from beneath by slide 47 which gradually assumes the concave shape of a 90° cylindrical segment, the shape of the bottom support guide 48 over which the papers are moved toward the scanning disc. The edges of the paper at the sides are initially held against the slide by edge guides 49 which becomes very close spaced to the slide 47, and bottom plate 48 at the position where the top plate 50 begins. The beginning of top guide 50 is flared upwardly so as to prevent any possibility of interference with the leading edge of each answer sheet but the top guide converges quickly toward a position very close spaced to the bottom guide in order to closely confine each answer sheet as it moves down the guide (see FIG. 3). In order to secure uniformity in the position of the paper within the guides 48 and 50, at one edge 52 the guides are joined to guide and prevent misalignment and sliding out of one edge of each answer sheet. At the other edge the guides are partially closed by rollers 53 (see FIG. 8). A variation of the edge control means of the guides 48 and 50 is shown in FIGS. 9a and 9b. In the FIGS. 9a and 9b embodiment the edge wall 52 is the same but the rollers 53 are eliminated and the edge of the guides terminated so that the paper 10 projects beyond them and into U-shaped brackets 55a, preferably integral parts of spring members 55 mounted at periodic intervals on the bar 56. Also as seen in FIG. 8 the top and bottom guide plates 48 and 50 are slotted along center lines in order to provide access to the papers by the belt conveyor means 15 from the bottom and friction applying rollers from the top.

Prior to the scanning disc and the gate 16, the conveyor, which is preferably an endless belt 58 supported on a plurality of guide pulleys 59 and driven in a manner which will be described, is held in position by the guide pulleys within the slot in bottom plate 48 so as to be able to frictionally engage the bottom surface of each answer sheet as it moves along the guides. Positive drive is provided by friction applying rollers 61 which are rotatably supported on shafts fixed to movable lever member 62. Member 62 is pivotally supported by a pivot pin 64 on reference member 63 fixed in turn to a portion of the frame 26. Lever member 62 may be rotated upwardly by counterclockwise rotation about pin 64 as viewed in FIG. 3 in order to disengage the rollers 61 from positive engagement with a sheet on the conveyor belt 58. This upward movement is effected by solenoid 66 against the action of spring 67 both of which are connected between the support structure 62 and some portion of the frame 26 or reference member 63. The amount of movement required to disengage rollers 61 is very slight as may be seen in FIG. 6 which shows the rollers raised and disengaged from the conveyor.

The gate structure 16 includes a pivoted stop finger 70 pivotally supported by rotatable pin 71 on fixed support member 63. Finger 70 has a sheet engaging tip 70a which in the position shown in FIG. 6 rests against the bottom guide 48 to block forward movement of an answer sheet 10. A link 72 engages a depression in pin 71 so that as member 62 is lowered to move rollers 61 against conveyor 58, the finger 71a is raised from the position shown in FIG. 6 to that shown in FIG. 3 to permit the passage of the answer sheet. The leading edge of each answer sheet is sensed just prior to the gate by sensing means 74 which may be the lever of a microswitch or other suitable means. This signal may enable the lowering of finger 70 and the raising of the rollers until the proper time for the sheet to pass through the gate in proper synchronism with the scanning disc.

Photopickup 75 supported relative to a portion of the frame 26 before the gate by block 76 responds to light 77 beneath a slot in the lower guide 48 offset to one side of conveyor belt 58 when an answer sheet does not block it. A second photopickup 78 senses position of the answer sheet after it passes the gate and announces the passage of a sheet passing the scanning disc. The gate may be controlled by these plate means. Each sheet is stopped when the gate is down and is driven forward between conveyor 15 and rolls 61 before the gate lowers and after it is raised.

An alternative system is shown in FIGS. 7a and 7b wherein the gate is provided by rods 80 having tips 80a which enter holes 81 in bottom guide plate 48. These rods are connected together by a cross member 82 about which they are rotated upward by counterclockwise movement as viewed in FIG. 7a as the structure 62, 63 is lowered. In this particular system sensor 74 is the actuator of a microswitch 84 which senses when the leading edge of an answer sheet is about to approach the gate. It can also sense when the lagging edge of the paper passes the gate so that the gate may be closed to index the following sheet. In this arrangement no photopickups are employed for leading or lagging edge detection.

After passing through the gate 16 a test answer sheet 10 passes beneath photodiode 78 and on beneath the photopickup 18 of scanning disc 17. Scanning disc 17 is so oriented by slightly canting its axis the direction of advancement of the sheet that as the sheet advances it the photopickup 18 cuts across the center of a particular row of answer indicator boxes. The speed of advance by the conveyor is timed such that for one rotation of the scanning disc the sheet advances a row. The rows may be a third of an inch apart on their centers, for example. This timing is accomplished by use of a single drive means 21 in a manner which will be described hereafter.

Figure 13:
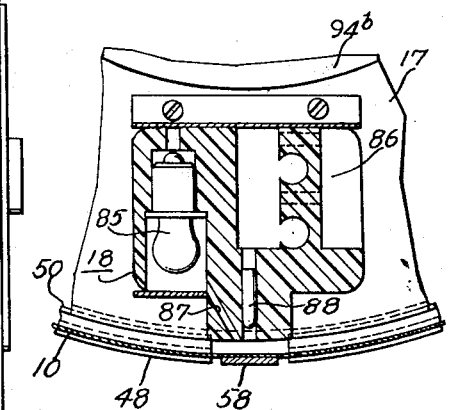
FIG. 13 is a detailed sectional view taken along line 13—13 of FIG. 12.

The scanning head as seen in FIG. 8, and in more detail in FIG. 13, consists of a light source 85 housed with block 86 of the scanning head. There is a light conducting duct 87 from the light source through the block so as to limit the region of the answer sheet 10 being illuminated. That duct as shown is at about a 45° angle from the vertical. The photopickup 88 is vertical above the area and hence by design does not pick up the specular reflection. It has been my determination that by use of specular reflections (angle of reflection equal to angle of incidence) certain marks may be missed because of insufficient light absorption. Here essentially all light viewed by photopickup 88 is absorbed by a black mark so that modulations occuring by virtue of marks are clearly detected and not missed. It will be observed that the scanning disc is mounted directly on the shaft 95 of motor 21 so that its speed provides the reference for all other system speeds.

Figure 12:
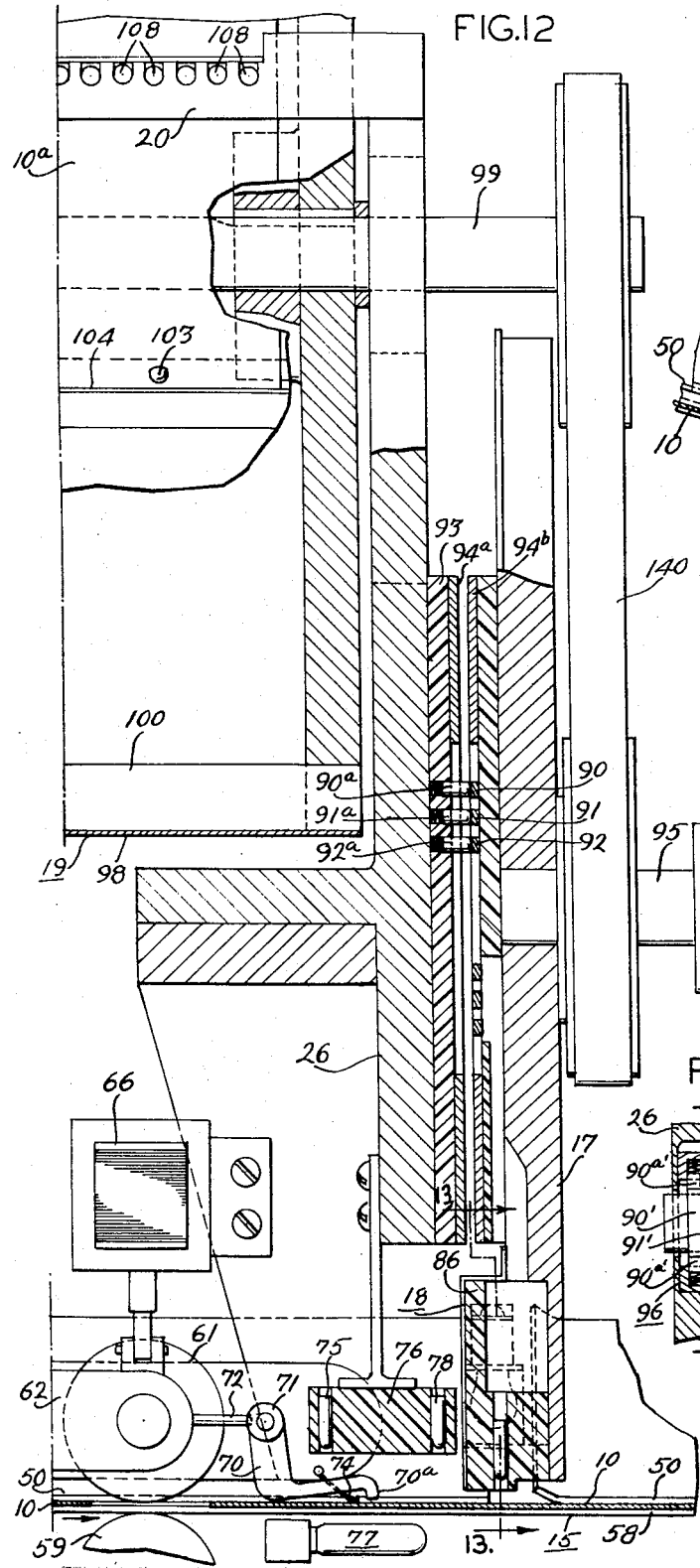
FIG. 12 is a sectional view taken along line 12—12 of FIG. 8.

As seen in FIG. 12, electrical connections to the light and the photopickups are made through slip rings 90, 91 and 92 by virtue of their contact with spring loaded brushes 90a, 91a and 92a mounted in a superstructure 93 to a bulkhead on the frame 26. Fixed and movable capacitor plates 94a and 94b may also be employed particularly to pick up the high frequency modulated light pickup signal without the noise and interference which might be introduced by brushes.

Figure 14A:
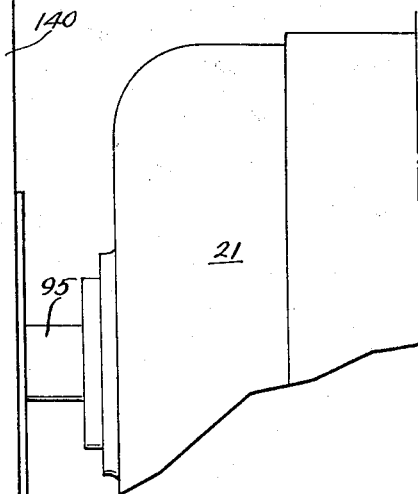
FIG. 14a is a sectional view taken along the drive shaft in the area of the slip rings showing modified slip ring arrangement from that of FIG. 12.
Figure 14B:
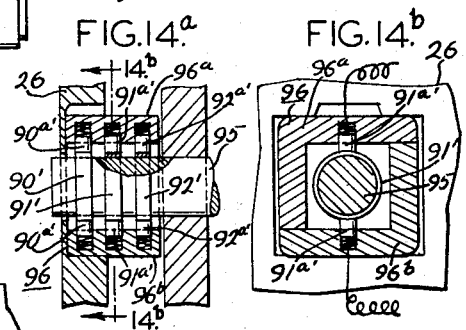

It is, of course, possible that an arrangement such as that shown in FIG. 14a may be substituted. There the slip rings 90', 91' and 92' are on the motor shaft 95 and the brushes 90a', 91a' and 92a' are held in a special block structure 96 affixed to the frame 26, i.e., the vertical bulkhead. The special structure 96 as seen in FIG. 14a is composed of two identical L-shaped parts 96a and 96b, each having its own set of brushes, corresponding brushes being connected in parallel in order to assure a signal. Those brushes are held in hollows of housing members 96a and 96b. In order to give limited universality to the movement of shaft 95 in order to afford some change in shaft position and adjustment of the canted position of scanning disc 17, the block structure 96 is loosely held at its vertical edges.

The scanning disc may be mounted elsewhere on the frame structure but is preferably placed in the position shown in FIG. 8 as well as FIGS. 1 and 2 in order to take advantage of the drive as well as the compactness of structure which it affords.

The score key drum 19 is preferably a hollow cylinder having an outer shell 98 fixed to a suitable supporting and bearing supplying frame fixed to shaft 99 on which it rotates. Part of the supporting structure consists of periodic bars 100 extending the length of the cylinder in the positions of cylindrical elements. Two of these bars provide locking means for locking the score key in place against the surface of sheet 98 of the drum. As can be seen in FIGS. 10 and 11 as well as in FIG. 8 those bars which are specially arranged to attach the score key to the drum 19 are provided with grooves 101 including at a very slight angle to the surface of the drum a flat binding surface 101a on which are provided resilient pads 102 and periodic pins 103 adapted to engage indexing holes in the score key 10a. Rods 104 are provided to overlie the pads and hold the edges of the key against the flat surfaces 101a. Each rod preferably fixed at each end to the drum by pivoted positive locking tabs 105 which have holes which engage the ends of rods 104. Each tab 105 is supported by a pin 106 from a suitable bracket on the drum so that it can rotate to the full line position from the dotted line position shown in FIG. 10 to engage the ends of rods 104 and hold them securely in place against centrifugal force tending to pull loose the score key from the drum as it is rotated. To release the key all that is necessary is to reverse the lever 105 from its full line position to its dashed line position and remove the rods 104. In some embodiments the score key may be covered with a suitable transparent covering intended to hold the score sheet more tightly to the drum surface.

Suitable extensions to the frame 26 are provided to support the sensing bar 20 immediately below a light bulb 107 which is adapted to be connected into a suitable circuit to provide appropriate lighting of the drum and score key surface. Immediately below the light in the arrangement shown recessed slightly within parallel bores in the sensing bar are a plurality of photodiodes 108 arranged in positions which correspond to the spacing between rows of indications and marks on the score sheet. One diode is provided for each row including sensing elements for the special information rows. Here again the diodes are positioned to receive non-specular lighting in order to provide a more accurate modulation of light picked up from the score key.

After it leaves the area of the sensing pickup the paper continues between the guides 48 and 50 still driven by conveyor belt 58 as seen in FIG. 15. As seen in FIGS. 1 and 15 the paper is held frictionally against the conveyor by a plurality of spaced rollers 110 rotatably supported on a special structure 111 supported on the frame.

While still within the guides 48 and 50 the paper is moved past the printer 22 as seen in FIGS. 2, 15 and 16. The printer structure is preferably supported by a pair of parallel rods or pipes 112 by means of a sliding block 113 and a suitable releasable clamping means 114 which has a portion 114a spring urged into frictional engagement with one of the pipes 112 in order to fix the printer in a selected position. The frictional position is held by spring pressure which may be released by clamping together with the fingers opposed finger portions of the clamp member 114. When thus released the printer may be slid axially forward or backward on the machine to vary the position on the test score sheet at which printing will occur. This permits printing information in different locations on the same sheet on successive runs. As may be seen in FIG. 15 the upper guide plate 50 is partially cut away in the region beneath the printer 22 so that printing can occur without interference. The printer yields the numbers shown in FIG. 17 by printing successive rows composed of no more than four dots to form 4 x 5 dot matrix figures. In order to accept the printing impact the guide plate 48 may be reinforced by auxiliary plate 115 to provide a suitable anvil against which the pins impinge. The individual printing pins 117 are held in a supporting block 118 above printing position by suitable spring means and are driven by individual solenoids downwardly against a ribbon 119 which runs between a pair of reels 120a and 120b beneath the block 118 between the block and paper. The reels derive support through their rotating shafts which are bearing mounted through bracket 120c affixed to the block 118. In addition to driving the pins the same solenoids drive the pawl 121 to actuate the ratchet 122 which drives one or the other tape reels 120a or 120b through a gear chain.

As seen in FIGS. 15 and 16 behind the ratchet is a gear 123 which, in turn, meshes with a gear 124 rotatably fixed to a radial arm 125 which is arranged to rotate about the center rotation of gear 123 and ratchet 122, pin 126. A spring 127 connected to the unsupported end of the arm 125 urges the arm against stop 128a, or alternatively against stop 128b. In either position the gear 124 meshes with a gear 130a or 130b which, in turn, drives a gear 131a or 131b fixed to the same shaft 132a or 132b to which the reel is attached and therefore drives the supported reel. In the position shown of arm 125, the left-hand side of the assembly as viewed in FIGS. 16 and 17 is driven by the ratchet 122 through the gear train 123, 124, 130a and 131a. The position of the arm is determined by the position of the ribbon roll bumper slide 133 which slides in a groove in block 118. Slide 133 carries an upstanding inverted L-shaped flange 134 the remote end of which is attached to the free end of spring 127 attached to arm 125. As the slide is moved back and forth by changes in ribbon roll radius the spring 127 passes over center of pin 126 and causes arm 125 to move from stop 128a to stop 128b, or vice versa. In the situation pictured reel 120a drives until it achieves sufficient radius to move the slide 133 to urge spring 127 to move arm 125 over center. Thereafter, reel 120b will be advanced until the amount of ribbon on it achieves sufficient radius to reverse the position of arm 125 through slide 133 acting to move arm 125 back over center. The conveyor 58 continues to advance the paper in the course of printing and thereafter until it is free of the last roll 110 and in such position to fall of its own weight due to gravity into collection hopper 23. This assumes that no error has been sensed in the scoring and that printing of the proper score has occurred and that the flap 24 is therefore maintained in the raised position shown in FIGS. 1 and 2. In the event that error occurs the solenoid 135 is energized and through crank member 136 to which it is attached urges the flap 24 downward against the action of spring 137 to the position shown in FIG. 18. As previously described this will cause diversion of the answer sheet to tray 25.

The drive system for the machine can be understood particularly with reference to FIGS. 1 and 2. There it will be seen that in addition to scanning disc 17 the main shaft 95 of the motor carries a timing belt pulley between which shaft another such pulley on score key drum is arranged a timing belt 140. If the score key is the same size as the sheet being examined, the score key drum 19 will be driven at the same speed as the scanning disc. It is possible to reduce the size of the score key and correspondingly reduce the size of the drum. Various modifications in drive arrangement will be obvious to those skilled in the art and can be adapted to achieve whatever result is desired.

The motor is preferably also provided with a reduction gear box 142 from which extends a shaft 143 driven at lower speed than the main shaft 95. This shaft may carry a sheave which in combination with a sheave on shaft 144 supports drive belt 145 (see FIG. 8). Shaft 144 also supports a pair of drive sheaves 147 for supplying the drive to conveyor belt 58 and sheave 148 for supplying the main drive through a sheave on shaft 150 which supplies the drive for pull out roll 35 and selector rolls 42. The method of accomplishing this is best seen in FIGS. 4 and 5. As seen in FIG. 4, shaft 150 carries a gear 151 which meshes with a gear 152 on shaft 153. Shaft 153 is a split shaft between the parts of which is a magnetic clutch 154 which enables the selector and pull out rolls to be driven or not driven as controlled by the machine operation. Shaft 153 also supports sheave 154 around which as well as sheaves 155, 156 and 157 is placed belt 158. Sheave 155 drives shaft 44 on which is mounted pull out roll 42. Sheave 156 drives shaft 36 on which is mounted selector roll 35 and sheave 157 is purely an idler which may be provided to permit some adjustment in the tension of drive belt 158, or otherwise.

Scoring is done by comparison with the score key shown in FIG. 19 and, as already discussed, which comparison is made electronically. Even through separate sensing means is used to scan each line of the test score key whereas the answer sheet is scanned sequentially line by line from the top to the bottom, the comparison is on a line by line basis as will be appreciated by the discussion below. From the above description it will be appreciated that the machine described must be arranged and adjusted to score an answer sheet such as that shown in FIG. 20 adhering to certain standards. In order for the machine to operate properly, the standard for the test sheet must be clearly established. Such standards as do exist are easily within the capabilities of the machine to an important degree. Test answer sheets such as that shown in FIG. 20, for example, must be a standard size and weight and color of paper, i.e., 8½" x 11" sheet of 16 pound white paper stock. A maximum preferably standard number of rows is desirable, i.e., 31 lines of response positions spaced three to the inch with the center line of the first ½-inch from the top of the sheet. The individual response positions should also be standard, and the following standards are typical. Each response position consists of a rectangular space .035" wide x .15" high indicated by guide lines or margins printed in light pastel blue or other color ink containing essentially no carbon or other material with high absorption characteristics for visible light and infrared radiation. The center of the first and last response position on each line are no closer than .375" to the sides of the sheet. The printing of such sheets must register against the right side of the paper as a reference. Response positions on each line should not be closer together than .115".

Among the standard score sheets which fall within this category is the Standard International Score Sheet, and such an answer sheet can be scored by the machine. In fact, any answer sheet within the standards above listed may be scored provided a compatible score key is utilized by the machine. Within these standards many arrays of possible answer spaces are possible. The convenient maximum response position array is 31 lines of 8 five choice questions. Other combinations may be grouped as follows for any given line: 8 five choice questions, 10 four choice questions, 12 three choice questions, 15 two choice questions, and 5 ten choice questions.

The score key shown in FIG. 19 determines the organization of response position scored by the machine since the score key includes means for indicating the grouping of response positions. Therefore, score key and answer sheets must be carefully coordinated in this as in other respects. It is possible to have a variety of questions in a given line or row. For example, one 10 choice, four 5 choice, two 4 choice and two 2 choice questions on the same line. In such cases the score key sheet must be coded to show this distribution, and this distribution must extend through every row for the whole length of the page. Assuming these to be 31 lines arrows there would then be 31 ten choice questions, 4 columns of five choice questions or 128 five choice questions, etc. These possibilities are predicated upon the use of two response position spaces for each of the question numbers on the answer sheet in order to afford room for proper printing on the answer sheet. It is also presumed that the response positions allocated for a given question must be consecutive positions across a given row and at the spacing determined by the clock lines 170 on the score key 10a.

In marking the answer sheet as well as the score key the mark should be made by any lead pencil and preferably by one firm, nearly vertical stroke the length of the response position box. Carelessly made marks may still be scored if they slant no more than 30° from the vertical and pass through the box. The present machine, moreover, is capable of discriminating against any marks or doodles distinctly outside the response position areas so that such marks will not affect the count of right and wrong in the scoring. In this way any area of the sheet excluding response areas may be used for any notes or other purposes provided the score key employed with the answer sheets does not indicate answers in the area used for notes and so long as the notes, of course, do not intrude upon the response areas.

The score key of FIG. 19 is quite similar to the answer sheet itself and is preferably on 8½" x 11" sheet of paper similar in layout and configuration to the answer sheet. The answer sheet, however, ordinarily does not contain question numbers and is provided with three additional lines not appearing on the test sheet. These are the clock marks 170 previously aluded to and grouping marks 172 in rows and part separator marks 173 in an extra column. The clock marks normally appear at the bottom of the sheet and indicate the spacing of response positions on the answer sheet and score key. They enable discrimination between answers and marks in intermediate positions. These marks must not be closer than .115" or nearer the sides than .375". Grouping marks 172 are arranged immediately above the clock marks 170 and are selected by the person setting up the test to indicate the number of choices for each question on a standard row or line of response positions and this remains the same for all lines. The grouping of the positions is indicated by placing a mark in the beginning and the end positions for each question group.

The response positions must correspond to the clock marks 170 and in preparing a score key a mark is placed in the correct answer position for each question. If no mark is placed in a particular grouping indicating a correct answer that grouping will be ignored in the scoring regardless of what may be on the answer sheets in corresponding locations. By this technique, a subset of questions may be scored by selecting only the questions in a particular desired group, marking the correct answer for those questions only on the score key, and then running the answer sheets through the machine. An accurate group score is obtained even though the questions may be randomly dispersed throughout the answer sheet.

The part separator line 173 is an extra column of positions at the right side of the score key sheet. Some machines will be provided with an optional part scoring device and in that event this column is used to indicate the last line of each part. Parts may be subdivided to include two or more lines, except for the last part of the sheet which must have five or more lines to the part. A mark in the part separator column signifies the end of one part so that its score may be printed and the scoring of a new part begun. Alternatively, part separation marks may be used to separate alpha-numeric data coding from answers. For example the name or number of the candidate taking an examination may be coded by marking response positions indicative of the successive letters of his name or the successive digits of his number, and this may be done at any selected line or lines by using part separation marks.

The top row 174 both on the score key and on the answer sheet is the identification indicator line which is used if the test scoring machine is to be used for direct entry into a computer or for recording on punch cards or magnetic tape. This permits the automatic entry of an identification number or other control number or computer addresses. The lines 174 on the score key and answer sheets may be marked to provide binary coded decimal numbers. Each consecutive four response position group then represents a single decimal number in binary code to facilitate manual coding.

FIGS. 21–29 show the sensing, computer and control circuitry for use with the machine of FIGS. 1–16 and 18. The circuits involved are shown in block or logic diagram form and will be understood for the most part to use conventional well known elements and components which therefore need not be discussed in detail. However, the systems themselves may in some instances be novel and are novel in this application. These circuits use signals generated by components of the machine previously described and signals generated by the logic circuitry itself. Certain signals, such as a signal from switch 41 indicating that more than one thickness of answer sheets has been selected by the pull-off rollers, may be used directly to inhibit the system from operation and to energize solenoid 135 of FIG. 19 to close the diverter flap 24 and cause those answer sheets to pass into the reject tray 25. Most signals, however, are used in a much more complex arrangement and may be used several times within the system.

The first sensing means of the computer logic is the photodiode pickup 75 just prior to the gate (see FIG. 12), or alternatively switch 84 actuated by means of sensing means 74, which senses the presence of the answer sheet at the gate. The signal is used to immediately energize the solenoid 66 to cause the gate to close and hold the top edge of the answer sheet in the registered position until time for the answer sheet to move beneath the scanning disc in proper timed sequence with the scanning mechanism. The photodiode produces a signal W indicating an answer sheet is at the gate and ready for movement through the system. The deenergization of the solenoid and the opening of the gate then occurs at a signal G which is timed relative to other signals of the system. The opening of the gate also generates a timing pulse $G_d$ which holds off the X or reading signal until the top edge of the paper has advanced to place the first row of intelligence below the scanning head. The answer sheet is advanced by the conveyor at a predetermined speed such that it will reach the level of the scanning dics immediately below the photopickup 88 such that photopickup 88 will cut across the middle of the answer boxes in row or line 174. As previously mentioned the pickup will cut across the middle of the boxes because scanning dics is canted sufficiently to compensate for the conveyor advance in the course of scanning. The speed of the conveyor and the scanning disc are respectively correlated to cause each successive line or row of answer boxes to be sequentially scanned. Means is also provided to sense the lateral edges of the answer sheet and generate signals representative thereof. The B signal represents the entry of the scanning disc into the scanning arc above the answer sheet and its passage across the sheet. At the end of the scanning arc are a signal E is generated and continues until the B signal is initiated for the next swing through the scanning arc. Whenever a pencil mark appears in a box in a line being scanned, the normally reflected light from the answer sheet is absorbed so that a pulse is generated. If the pencil mark is clear and sharp, the light absorption pulse generated at the photodiode 88 will be accepted by the circuit as hereinafter described, but if a fuzzy mark appears, such as an erasure incompletely or improperly made, the signal will be rejected. This rejection may be accomplished by eraser discrimination circuitry of a conventional pulse signal differentiating type with a tolerance to rate of change of signal above a certain rate required in order to permit the signal to pass. A signal level quality check signal L may also be employed to make sure that the signal amplitudes which fall into a doubtful range are detected and such answer sheets are rejected (i.e., solenoid 135 closes diverter flap 24 to shunt the sheet into tray 25) for manual or other special grading techniques.

While the signals are thus being generated by pencil marks at the scan disc, other signals are being generated in a similar manner at the score key drum by virtue of the multitude of photodiodes 108, one corresponding to each row of boxes on the score (FIG. 19). Signals from those diodes scanning rows 172 and 170 are constantly employed. Marks in row 174 produce a series of pulses which are comparable with the pulses picked up in row 174 on the answer sheet of FIG. 20 and hence may be handled on the sequential line by line selection basis employed to read the answer rows. However, the logic for comparison of line 174 on the answer sheet and score key is separate from the circuitry for a comparison of answers. The X signal from photodiode 78 indicates that the answer sheet is in proper position and is effective to enable pulse information from the scan head to be transmitted into the logic circuitry once the sheet is in proper reading position. The signal X is terminated at the end of the scan time and at this time another signal $X_d$, a limited time pulse, is produced in order to permit comparison of the total count register and the score register to determine if the proper reading and counting has taken place. Since from the X signal and time lapse the location of the sheet advancing on the conveyor is known and from the B signal the beginning of the scanning arc is known, by use of an appropriate switching mechanism the appropriate ones of the photodiodes 108 may be successively switched into the circuit for comparison purposes of answer pulses from the scanning head with the score key. Meantime, certain diodes 108 are effective to record the clock marks and answer boundary marks 170 and 172, respectively. The clock pulses are designated herein C and the periods within question boundaries during which questions may be answered are designated by a signal Q which is generated by answer boundary pulses. A shorter period pulse $Q_d$ is also generated at the end of a Q signal to establish arithmetic time. A special part score pulse is initiated through a pulse P, generated when the mark is detected by scanning photodiode 88 as it passes the last column 173. Such a pulse will instruct the logic of the system to print out the partial score for the previous part and begin a new count of partial score for the next part. Most of the other signals as will be described hereafter are generated by the logic circuitry using to some extent the above described signals.

Various registers and counters are required. The total count register is preferably a manually set device which may, for example, set up in binary coded decimal digits instructions to the error logic system that the total counts which should be accumulated are to be so many, i.e., the total of right and wrong answers and omits should equal the amount on the register or an error has occurred. A score register is used as a storage of the score as it is sensed and calculated. This may be a display device, if desired. A line counter counts the lines and accomplishes the switching from one photodiode 108 to another as previously described.

Referring now to FIG. 21 a photodiode representative of the scanning head pickup 88 is employed to generate pulses as light from light source 85, which is normally reflected, is largely absorbed by pencil marks on the answer sheet row being scanned. The signal as generated may be subject to amplification in scan read circuitry 180 and then passes to erasure discrimination circuitry 181. As previously described, this circuitry includes differentiating means which permit a pulse to pass if it has sharp boundaries. On the other hand, if the pulse builds up relatively slowly and irregularly and falls off in the same manner due to smudges or erasures, such a signal will be rejected and not permitted to pass. A clipper amplifier next after amplifying the signal, cuts off the lower portion of the signal thereby eliminating low amplitude noise. If signal quality is imperfect for any reason the signal quality circuit 183 generates reject impulse signal L which may be fed directly to the reject driver 191 at the bottom of the diagram. On the other hand, if the signal quality is satisfactory and falls within the limitations provided by the pulse standard margin delineator 184 a one-shot multivibrator generates a pulse of standard width. The output signal A is an answer signal which may then be subjected to comparison with score key pulses to determine whether the answers are correct or incorrect. The signal A is fed to the "and" gate 185 which passes it only if there are simultaneously present signal Q, indicating that the A signal is within the question boundaries defined by marks in row 172 on the score key and signal X, indicating that the answer sheet is in proper reading position with respect to the scanning head. The simultaneous presence of all three signals at "and" gate 185 results in the passage of a signal D representative of data read during a question interval indicating a mark scored without regard to whether that mark is right or wrong. A second pulse passing gate 185 during a given question interval is the result of a multiple answer response. The D signal operates flipflop 186 which feeds the error logic generally designated 187. The error logic 187 is also fed by the "and" gate 188 which requires simultaneous signals from the manually set total count register 189, the score register, and the signal $X_d$ the one-shot multivibrator signal fired at the fall of the X signal flipflop at the end of each answer sheet. As implied by the "and" gate relationship, the signal $X_d$ is the enabling pulse which permits comparison of the total count register and the score register to determine if a proper reading and counting has taken place. If not, an error signal is fed to the error logic and/or through the "or" gate 190 to reject driver 191 and/or through "or" gate 192 to the error code in the line counter. The error logic 187 may have an output indicating no error A signals, O omitted answer signals and M multiple answer signals.

FIG. 22 shows schematically how the correct answer signal K is obtained from the score key. Each of the lines is simultaneously scanned by one of the photodiodes 108. As shown in FIG. 22 the B signal indicating the beginning of the scan arc at the answer sheet actuates the line counter 195 which, in turn, actuates the successive line switch 196. Switch 196 switches from one photodiode 108 to another picking up the successive rows of the answers on the score key so that the signal K employed for comparison will be of the line corresponding to that being scanned by the scanning disc photodiode 75.

FIG. 23 shows a logic diagram of the Q signal generator as well as the $Q_d$ signal generator. Again a photodiode in the line 108 picks up the question indications 172 on the score key and as a result of the pulse that is generated actuates a flipflop circuit 197. The first pulse indicating the beginning of the question group turns the flipflop on and the second pulse turns the flipflop off. A B signal indicating that the scanner is beginning its scanning position is effective to reset the flipflop to the same initial condition for each row. The termination of each group signal acts on the one-shot multivibrator 198 to generate the $Q_d$ signal which is a pulse of predetermined length. The purpose of this signal is to establish shift and arithmetic time to enable the setting of the control flipflop prior to arithmetic activity.

Part of the error logic of system 187 is seen in FIGS. 24 and 25. In FIG. 24 the error logic for the multiple response is indicated. This consists of an "and" gate 200 to which are fed the X, C, A, and D signals all of which must occur simultaneously for output from the "and" gate 200 to occur. The X signal is a signal which is generated in timed relation to the gate signal to indicate when the answer sheet is in proper reading position. X is turned on by the signal $G_d$ and off by the line counter overflow signal. $G_d$ is a signal generated by a one-shot multivibrator fired at the opening of the gate and timed to prevent operation of the scan disc pickup until the sheet is in proper position. The fall of $G_d$ generates the X signal by setting of the X flipflop. The C signal also fed into the "and" gate 200 is a clock pulse picked up by a photodiode 108 in the score key line 170. The answer signal A is generated by the process shown in FIG. 21 and representing answers marked on the answer sheet. The D signal is a secondary level signal generated by the system of FIG. 21 as an output from flipflop 186. It will be observed that none of these signals indicates whether the answer to a question is right or wrong. The first signal pulse which passes through gate 200 actuates the flipflop 201. No signal is put out at this time but should the flipflop again be energized the signal M is generated by the flipflop 201, indicating a multiple answer during the question period. A $Q_d$ signal is supplied to restore the flipflop to normal starting position at the end of each question.

FIG. 25 shows the logic which indicates the omission of any answer in a question interval. If an answer is possible because the sheet is in proper place beneath the scan disc as indicated by the X signal but no answer has been given to set the D flip-flop signal (indicated at $\overline{D}$) and the end of the question period has been signalled by $Q_d$, the simultaneous presence of these three signals will generate an omit signal O through the "and" gate 202.

Referring to FIG. 26 the manner of generation of the B and E signals representing the beginning and end of the scan is shown. This may be accomplished by a location of separate B and E pickups 204 and 205 respectively relative to the scan disc 17, or on the key drum. Pickup 204, for example, may be a photodiode fixed in position relative to the answer sheet guides 53 so that light from light source 85 strikes it just as the scanning head reaches the edge of the answer sheet guide and just prior to scanning the answer sheet. Pickup 205 may also be a photodiode placed to receive light from source 85 just after the scanning arc is completed by location in position just past the edge of the answer sheet guide 52 the other side of the machine. Both signals may be used to energize a flipflop circuit 206 such that signals from the diode 204 cause the flipflop to assume one condition and signals from diode 205 cause the same flipflop to assume the other condition. Signals B and E are opposite and therefore may be taken from appropriate terminals of flipflop 206. It will be apparent how these signals represent the beginning and the ending of the reading of a particular line of the answer sheet.

The clock pulse signal C has been previously described. The nature of its generation may be seen by examination of FIG. 27. One of the diodes 108 picks up variations in light produced by the clock marks 170 on the score key (see FIG. 19). The pulses produced by the marks are amplified by amplifier 208 and fed to one-shot multivibrator 209 which generates pulses of sufficient width to assure that marks within the space of the box provided may be interpreted as answers.

Figures 28, 29:
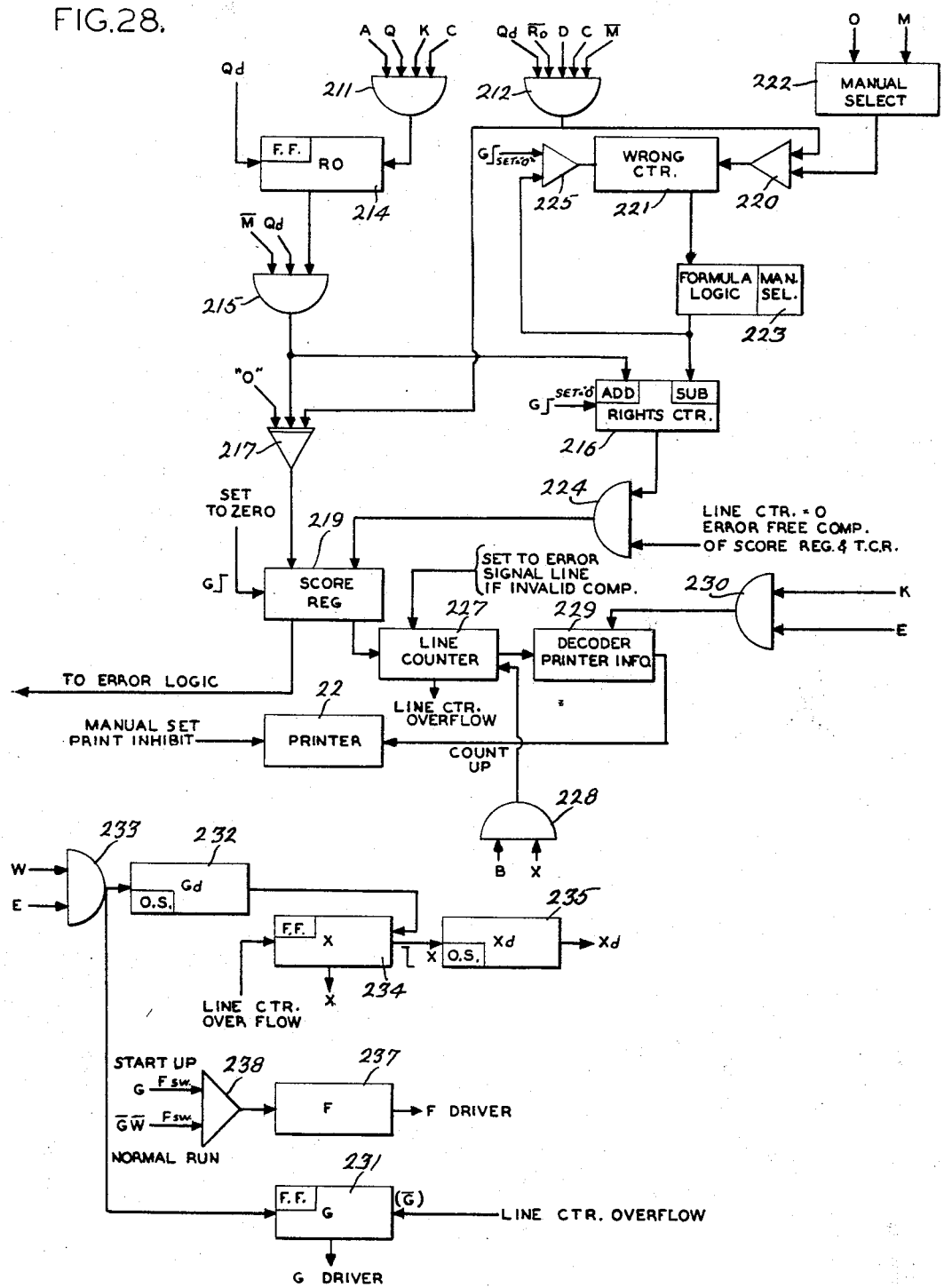
FIG. 28 is a logic diagram of a computer circuit receiving signals from circuits previously illustrated, computing the score and printing out the score.
FIG. 29 is a logic diagram of the feed and gate control circuits.

The actual computation of score is accomplished by the system shown in FIG. 28 which includes a printer. The input to this computer is through a pair of "and" gates 211 and 212. Other signals are fed into other parts of the computer and signals generated within the computer may be fed out of the system throughout its entire length.

Into "and" gate 211 are fed signals A, Q, K and C. A is of course the answer signal from the scan disc generated as shown in FIG. 21. Q is a question interval signal generated by the system shown in FIG. 23. K is the answer signal from the key drum in the correct answer position and C is the clock pulse signal. If all these signals occur simultaneously a correct answer is recorded by the passage of a signal representing the right answer to flipflop circuit 214. The flipflop generates a signal applied to the further "and" gate 215. At the end of each question interval the flipflop 214 is turned off by the $Q_d$ signal. If $\overline{M}$, $Q_d$ and the signal from flip-flop 214 indicating the right answer all occur simultaneously the signal is permitted to pass to the rights counter 216. $\overline{M}$ represents the absence of any multiple response signal. The signal generated by "and" gate 215 is also fed to "or" gate 217 so that right answers received from it, wrong answers received from gate 212, and omitted answers received from the omit error circuitry will all be fed to the score register 219.

The wrong answer "and" gate requires the simultaneous presence of signal indicating the absence of right answers, that is, $\overline{R}_o$ (a signal representing the possibility of a right answer) D, C and $\overline{M}$ (see above) at the time the end of a question period is signalled by $Q_d$. Signals passing through "and" gate 212 register clearly wrong answers and exclude multiple choices and omitted answers. Such wrong answers are fed to the score register 219 through "or" gate 217 and simultaneously through an "or" gate 220 to a wrongs counter 221. Also fed through the "or" gate 220 if selected to be by the manual selector 222 are O signals or M signals representing omitted or multiple answers. The manual select makes it possible for either or both of these signals to be included or excluded depending upon the choice of the machine operator. The wrongs counter 221 then feeds its count to a formula logic circuit 223 with a manual selector. This makes it possible selectively to disregard wrong counts in the score or to subtract wrongs from rights on the basis that one is subtracted for each one, two, three or four wrong answers. The design and capacity of particular machines may differ in this particular area. The output of the formula logic circuit is fed into the subtract part of the rights counter. The rights counter then subtracts from the right answer count whatever count accumulates from the formula logic of the wrongs is subtracted from the rights and the difference is fed on to the "and" gate 224. A feed back is also provided from the formula logic to an "or" gate 225 which functions to reset the wrongs counter so that, whenever a pulse passes out of the formula logic circuit for subtraction in the rights counter, a reset pulse is returned to the wrongs counter and resets it to zero. Accumulation is then begun of the predetermined number of counts required to subtract one from the rights as selected by the manual selector of the formula logic. The gate signal G will automatically reset to zero the wrongs counter 221 through "or" gate 225 and the rights counter 216 directly. The rights minus a particular quotient of wrongs is passed to the score register 219 provided a signal is also present at the "and" gate 224 indicating error free computation at the score register and the total counts register. As previously mentioned the score register serves to check a sum of omits, rights and wrongs against a preset count in the total counts register. If this comparison checks the end of a particular answer sheet then the rights minus wrongs counts is permitted to pass through the score register 219 to the line counter. The score register is reset by the gate signal G to begin a new count. The simultaneous presence at "and" gate 228 of a B signal indicating beginning of line scan and X signal indicating presence of the answer sheet permits the line counter 227 to pass the score on to the decoder printer in formation 229. This will occur after the line counter produces an overflow signal after enough lines to complete the scanning of a particular answer sheet have been completed. This same overflow signal may be used to inhibit further counting thereafter. If invalid computation should occur instead of printing out a score an error signal is generated and this stops the action of the line counter. Assuming, then, that the line counter operates properly, the signal from the rights counter 216 which is passed through the score register 219 passes through the line counter 227 to the decoder printer information 229.

The decoder printer information advantageously is stored permanently on the part of the score key drum not used for the score key. The information is read by the same photodiodes which are used to read the score key. Thus, the decoder printer is activated by "and" gate 230 only when an E signal indicating end of the scanning arc is present. Answer readings from the score key drum in this region code instructions for printer operation. The decoder printer information 229 is set by the score it receives to produce the correct switching to permit that information on score key on the reverse side of which is pertinent to that particular score to be printed. Signal K again synchronizes the coding to select only a decoder information in specific positions to trip the proper solenoids of the four print pins to print in proper sequence the numbers representing the score. Printing will then occur on the test score sheet as previously described unless the manually set or electronic printing inhibit mechanism has been activated.

The gate and the feed driver operate through the circuitry shown in FIG. 29. It will be seen that in order for the pulses to be fed to the flipflop circuit 231 generating the gate drive signal and flipflop circuit 232 generating a pulse of predetermined length $G_d$, it is necessary that there simultaneously appear at the "and" gate 233 the E signal indicating the end of the scan and the W signal indicating that answer sheet is at the gate as determined by the switch 80 or the photopickup 75. If both of these signals are present, a pulse actuates flipflop 231 deenergizing the solenoid 66 allowing the gate member 78 to open so that the paper can be moved forward by the conveyor as previously described (see FIG. 12). This solenoid is turned back on by the line counter overflow which determines the $\overline{G}$ signal. The same signal from "and" gate 233 which generates the G driver signal at flipflop 231 also generates the $G_d$ signal at one-shot multivibrator 232. Multivibrator 232 produces effectively a timing pulse which is timed to disable the scanning operation until the sheet is in proper position. The end of the output pulse $G_d$ actuates the flipflop circuit 234 to generate the X signal in similar manner to the G flipflop 231 the F flipflop 234 is turned off by the line counter overflow. The fall of the X flipflop fires the one-shot multivibrator 235 which generates a pulse $X_d$ of predetermined length. This pulse serves to cause the total count register and the score register to be compared to determine whether the proper reading and counting has taken place, the final check before print out is permitted.

The F driver signal is used to open magnetic clutch 154. The F driver generator 237 is connected to the output of the G driver generator 231 through "or" gate 238. Signal G causes the F signal which is applied to the magnetic clutch 154 to stop the drive of the selector and pull out feed rollers while the gate is closed. The F signal allows the clutch to engage and drive these rollers when the gate is opened. Thus the clutch is opened as long as the G signal is present through the "or" gate 238. It is also opened through the F driver generator 237, even if there is no G signal, as long as there is no W signal (there is a $\overline{W}$ signal) indicating that no answer sheet is waiting at the gate.

One embodiment of the present invention in the form of a test scoring device has been described. It will be appreciated by those skilled in the art that there are many modifications of the test scoring device, its components and elements. Moreover, the use of the present invention is not limited to the type of machine disclosed but may be used in other machines for other purposes. All such modifications within the scope of the claims are intended to be within the scope and spirit of the present invention.

I claim:

1. A machine for sequentially scanning selected lines on a surface of successive pieces comprising a supporting frame, a scanning member rotatably supported on the frame including a scanning pickup element, conveyor means on the frame substantially parallel to the axis of rotation of the rotatable scanning member for moving the successive pieces having a surface on which lines are to be scanned past the scanning pickup element at such a rate that the pickup element will pass successive lines or rows one at a time, means on the frame to drive the scanning member and the conveyor at proper speeds relative to one another, feed means supported on the frame for feeding the successive pieces one at a time to the conveyor, guide means assuring proper orientation of the pieces on the conveyor for scanning by the scanning member, and indexing means, including means referencing on some predetermined part on each piece to cause the selected lines of each piece to assume proper position relative to the scanning member as said piece passes the scanning member on the conveyor.

2. The machine of claim 1 in which the guide means includes means for curving the successive pieces into a segment of a cylindrical surface having an axis essentially coinciding with the axis of rotation of the scanning member and means for supporting said material in this form as it is moved along the conveyor.

3. The machine of claim 2 in which the axis of rotation of the scanning member and the axis of the cylindrical segment diverge slightly in such direction as to produce a canting of the scanning member such that scanning will progress essentially perpendicular to the direction of movement despite the movement of the successive pieces.

4. The machine of claim 1 in which the successive pieces scanned are in the form of flexible sheets and the conveyor means is associated with support and guide means on the frame holding the flexible sheets in a segment of a cylindrical surface having an axis essentially coinciding with the axis of rotation of the scanning member.

5. The machine of claim 4 in which the axis of rotation of the scanning member and the axis of the cylindrical segment diverge slightly in such direction as to produce a canting of the scanning member such that scanning will progress essentially perpendicular to the direction of movement despite the movement of the sheets.

6. The machine of claim 4 in which the guide means provides close spaced top and bottom members between which each successive flexible sheet moves and edge guides along the edges between the top and bottom members, the guide for one edge being fixed and the guide for the other edge being movable.

7. The machine of claim 6 in which the movable guide is a series of spaced rollers whose sheet contact edge lies in a line parallel to the direction of conveyor movement.

8. The machine of claim 6 in which the movable guide members are resilient members having U-shaped guide portions positioned to engage one edge of the sheets and a resilient support portion resiliently resisting movement of the bottom of the U's from along a straight line.

9. A machine for sequentially scanning lines on the surface of successive flexible sheets comprising a supporting frame, a scanning member rotatably supported on the frame, including a scanning pickup element, conveyor means on the frame substantially parallel to the axis of rotation of the rotatable scanning member for moving successive sheets having a surface on which lines are to be scanned past the scanning pickup element at such a rate that the pickup element will pass successive lines or rows one at a time, means on the frame to drive the scanning member and the conveyor at proper speeds relative to one another, and guide means associated with the conveyor including edge guides in position to engage the edges of each sheet, the guide along one edge being fixed and the guide along the other edge being movable, and close spaced top and bottom guide members between which each sheet moves, including at least a bottom transition guide which gradually curves from a planar to a cylindrical segment form and an upper center deflector urging the center portion of each sheet downward while the edge guides maintain the edges higher, and guide means after the transition guide holding each flexible sheet in a segment of a cylindrical surface having an axis essentially coinciding with the axis of rotation of the scanning member.

10. The machine of claim 1 in which the conveyor means consists of at least one narrow endless belt, substantially narrower than, centrally located with respect to, and beneath the successive pieces bearing lines to be scanned, and rollers rotatably supported above the material being scanned and urging that material downward and into contact with the endless belt.

11. The machine of claim 5 in which the conveyor means consists of at least one narrow endless belt, substantially narrower than the flexible sheets, centrally located in a slot in the guide means and so positioned as to not interrupt the continuity of the arc of a sheet established by the guide means, and roller means rotatably supported above the conveyor and urging the sheets downward and into contact with the endless belt.

12. A machine for sequentially scanning lines on the surfaces of successive flexible sheets comprising a supporting frame, a scanning member rotatably supported on the frame, including a scanning pickup element conveyor means consisting of at least one narrow endless conveyor belt, substantially narrower than the flexible sheets and substantially parallel to the axis of rotation of the rotatable scanning member, for moving successive sheets having a surface on which lines are to be scanned past the scanning pickup element at such a rate that the pickup element will pass successive lines or rows one at a time, means on the frame to drive the scanning member and the conveyor means at proper speeds relative to one another, support and guide means holding the flexible sheets in a segment of a cylindrical surface having an axis essentially coinciding with the axis of rotation of the scanning member but diverging therefrom slightly in such direction as to produce a canting of the scanning member such that scannning will progress essentially perpendicular to the direction of movement despite the movement of the sheets, the conveyor belt being located centrally with respect to the guide means and on the outside side of the guide means and roller means rotatably supported inside the guide means opposite the conveyor belt to be movable away from the conveyor belt to permit slippage of the sheets relative to the conveyor belt and toward the conveyor belt to urge a sheet into the conveyor belt until it is moved by the conveyor belt.

13. The machine of claim 12 in which the gate means is arranged to be actuated downward into the path of the sheet when the roller support is raised.

14. The machine of claim 13 in which means is provided for causing the gate means to rise and the roller support to lower at the proper time relative to the movement of the scanning member so that the rate of advance of the conveyor will position the lines to be scanned in proper position for reading.

15. The machine of claim 13 in which the roller support is pivotally supported on the frame and means is provided to rotate the roller support about said pivotal support to raise the rollers away from the belt.

16. The machine of claim 12 in which rollers supported on the frame to urge the sheet against the conveyor belt are provided following the scanning member in position to engage the forward edge of a sheet before the end of the sheet leaves the last roller before the scanning element.

17. The machine of claim 16 in which the drive means for the scanning member and the conveyor belt are the same and permit proper synchronism through mechanical coupling means.

18. The machine of claim 1 in which means is provided for simultaneous scanning of a key provided with information in lines corresponding to those on the material to be scanned, including key pickup means for scanning the lines of the key and sequencing means to assure said pickup proper sequence of pickup signals and comparison means for comparing signals from the scanning pickup and the key pickup means and producing an output giving comparison data.

19. A machine for sequentially scanning lines on the surfaces of successive flexible sheets comprising a supporting frame, a scanning member rotatably supported on the frame, including a scanning pickup element, conveyor means on the frame substantially parallel to the axis of rotation of the rotatable scanning member for moving successive sheets having a surface on which lines are to be scanned past the scanning pickup element at such a rate that the pickup element will pass successive lines or rows one at a time, means on the frame to drive the scanning member and the conveyor at proper speeds relative to one another, support and guide means holding the flexible sheets in a segment of a cylindrical surface having an axis essentially coinciding with the axis of rotation of the scanning member, scanning pickup means for scanning the lines of a score key having corresponding lines to those on the sheet being scanned in synchronism with the scanning by the scanning pickup and sequencing means to assure that the lines on the score key are compared in proper sequence and correspond to those on the sheet being scanned by the scanning pickup.

20. The machine of claim 19 in which the score key is placed over a cylindrical segment of a rotatable drum so that the lines to be scanned are everywhere at an equal radius from the axis of rotation.

21. The machine of claim 20 in which there are individual pickup means for each of the rows or lines to be scanned on the score key positioned along a line parallel to the axis of the drum in position to pick up the lines on the score key as the drum rotates and the sequencing means is a switching means to sequentially select the key pickup means in order to permit comparison of corresponding lines on the sheet and key.

22. The machine of claim 21 in which the score key drum is provided with means for attaching score key sheets so that individual sheets may be attached and replaced as required.

23. The machine of claim 22 in which the means located along elemental lines of the drum for attaching the score keys include locating pins to engage holes at opposite edges of the score key, rod means for overlying each edge of the score key in the region of the pins to hold the sheet against the drum, and loop means at each end of the drum for holding the rod to the drum.

24. The machine of claim 23 in which at least one of the loop means for holding the rod in place is pivotally supported on one end of the drum to move in an arc in a radial plane of the drum.

25. The machine of claim 22 in which a light source is provided adjacent to the drum and the key pickups are arranged in a row parallel to the drum axis but so located that reflection will be diffuse.

26. The machine of claim 20 in which the scanning member is a disc and the score key is a drum driven in synchronism by the same motor.

27. The machine of claim 4 in which electrical connections to the scanning element include a light source and photopickups on the scanning member which provides a disc surface concentric with its axis of rotation are made by means of slip rings and brushes between a portion of the frame and the rotating scanning disc.

28. The machine of claim 27 in which the brushes are located in a fixed bulkhead portion of the frame and adapted to bear against concentric flat slip rings on the surface of the scanning disc.

29. The machine of claim 27 in which the brushes are located in a housing in a portion of the frame and bear against circumferential slip rings on the shaft of the motor.

30. The machine of claim 29 in which the support bearing for the scanning disc is formed so that it can be moved relative to the frame to change the cant of the scanning disc.

31. The machine of claim 27 in which in addition to slip rings for supplying power to the light source there is provided opposed capacitor plates around the entire circumference of the relatively rotatable surface, the spacing between which provides an air gap dielectric for the capacitor and which are adapted to transfer the high frequency signals received from the scanning head.

32. A test scoring device for use in scoring standard test answer sheets comprising a supporting frame, drive means on the frame, conveyor means driven by the drive means to advance answer sheets through the machine, a rotatable scanning member positioned relative to the conveyor to scan sequentially lines on each answer sheet as it advances on the conveyor, said scanning member including a suitable pickup element for detecting marks on the answer sheet, a score key drum driven by the motor and adapted to support a score key on which correct answers are marked in positions corresponding to answer positions on the answer sheets, score key pickup means for detecting information marked in the marked rows of the score key and means for sequentially selecting the signal from the pickup means from the proper line on the score key so that comparison can be made with the signal from the scanning member pickup, the rotation of the scanning member and the score key drum being synchronized so that the scanning pickup and the score key pickup essentially simultaneously pick up from corresponding positions on the answer sheet and score key and comparison means for comparing signals representing marks detected by the scanning pickup with signals from the score key pickup, and logic circuitry for distinguishing at least between right answers and wrong answers.

33. The device of claim 32 in which marks on the answer sheet will be counted only if they are clear marks, including an erasure discriminator which includes signal differentiating circuitry which passes only signals which have sharp edges and rejects others.

34. The device of claim 32 in which clock marks are provided on the score key and are used to generate a signal applied to an "and" gate which permits the passage of answer signals only when they occur in synchronism with the clock marks being placed at the box locations in which answers are to be marked.

35. The device of claim 32 in which right answer signals are passed at an "and" gate at which signals from the scanning pickup coincide with signals from the score key pickup.

36. The device of claim 35 in which the "and" gate in order to pass the right answer signal additionally requires the presence of a clock mark signal, a mark signal indicating the possibility of the presence of an answer, and the actual presence of an answer, respectively.

37. The device of claim 32 in which there are provided an "and" gate at which at least answer signals from the answer sheet and clock signals must be applied to pass a signal, a flip-flop circuit which changes state at each signal from the "and" gate and passes a signal only upon the occurrence of two pulses from the "and" gate, another flip-flop circuit responding to signals generated by boundary marks on the score key at the beginning and end of the question period and means to generate a signal at the end of a question period connected to the first flip-flop to turn it off at the end of each question period.

38. The device of claim 32 in which an "and" gate is provided to pass an omit signal upon the failure of any answer to appear during the question interval upon the essentially simultaneous occurrence of signals indicating at least the end of the question period and the absence of a possible answer during the period.

39. The device of claim 32 in which wrong answer signals are passed by an "and" gate upon essentially simultaneous application of at least signals indicating the presence of an answer on on the answer sheet, a clock mark and the absence of a right answer.

40. The device of claim 32 in which wrong answers are distinguished from multiple answers and non-multiple wrong answer signals generated by an "and" gate upon the essentially simultaneous application of signals indicating the presence of an answer on the answer sheet during a question interval, the absence of multiple answers during a question period, the absence of the right answer during a question period and the end of the question period.

41. The device of claim 40 in which means are provided whereby multiple score signals are selectively addable separately as separate counts to a wrongs counter, if desired.

42. The device of claim 39 in which means are provided whereby omit signals are selectively addable to the wrongs counter, if desired.

43. The device of claim 32 in which there are provided a register to total right answers, a register to total wrong answers, circuitry to divide wrong answers by a selected factor and total the quotient and a score register to subtract the quotient of wrong answers divided by a factor from the right answers.

44. The device of claim 43 in which selection means are provided to select the divisor factor to be applied by the circuitry to divide wrong answers by the selected factor.

45. The device of claim 32 in which a printer is provided for printing out score information and printer instructions from the logic circuitry score output obtained from information on the score key drum in the area other than that occupied by the score key, in order to actuate the printer.

46. The device of claim 45 in which sensing means are provided to detect the beginning and the end of the score key and during the interval when the score key is not active, switching means actuated by the count logic circuitry is employed to switch in the proper pickups in the proper sequence to achieve the desired printing out.

47. The machine of claim 18 in which printing means is provided along the conveyor to receive instructions from logic circuitry and print out the score totaled by the machine on each answer sheet.

48. The machine of claim 47 in which the print out mechanism is adjustable and is positioned relative to the scanning disk in order to make it possible to print scores at different levels along the side of the answer sheet.

49. The machine of claim 47 in which the printing mechanism consists of a row of solenoid driven pins which are guided against a suitable ribbon to print a selected pattern of dots in a row and logic circuitry for sequentially actuating different combinations of solenoids to drive the proper pins to form successive rows of dots until a figure is completed.

50. The machine of claim 1 in which the scanning pickup element consists of a light source and a photosensitive element, the two being arranged so that the pickup receives only diffuse reflection of light from the source off of the surface being scanned.

51. A data comparison device for comparing input data sheets with a key sheet comprising a supporting frame, drive means on the frame, conveyor means driven by the drive means to advance the input data sheets through the machine, a rotatable scanning member positioned relative to the conveyor to scan sequentially lines on each input data sheet as it advances on the conveyor, said scanning member including a suitable pickup element for detecting marks on the input data sheet, a key drum driven by the motor and adapted to support the key sheet on which preselected criteria are marked in positions corresponding to data positions on the input data sheets, key pickup means for detecting information marked in the marked rows of the key and means for sequentially selecting the signal from the pickup means from the proper line on the key so that comparison can be made with the signal from the scanning member pickup, the rotation of the scanning member and the key drum being synchronized so that the scanning pickup and the key pickup essentially simultaneously pickup from corresponding positions on the input data sheet and key and comparison means for comparing signals representing marks detected by the scanning pickup with signals from the key pickup, and logic circuitry for determining coincidence of marks on the input data sheet and the key.

52. The data comparison device of claim 51 in which a clock track of marks on the key is detected by a clock pickup means and logic is supplied whereby the signal from the clock pickup means indicates to the logic the horizontal distribution of mark positions across each row.

53. The data comparison device of claim 51 in which an extra column of positions is provided one at the end of each row in which a mark may be placed to indicate division of the data and logic is supplied whereby signals from the key pickup means at the position of said column indicate to the logic the end of one part of the data and the beginning of the next.

54. The test scoring device of claim 3 in which a question interval track of marks on the score key is detected by a question interval pickup means and logic is supplied whereby the signal from the question interval pickup means indicates to the logic the grouping of consecutive response positions belonging to each of several question intervals across each row.

55. The test scoring device of claim 54 in which logic is provided whereby unless a mark appears on the score key within a given question interval no comparison is made of answers appearing on the answer sheet within that interval and no score is recorded whereby special marking of answer keys permits a partial score of selected questions.

56. The machine of claim 1 in which the indexing means includes means which stops and intermittently permits the successive pieces to move along the conveyor past the scanning member.

(References on following page)

References Cited

UNITED STATES PATENTS

| | | | |
|---|---|---|---|
| 1,872,945 | 8/1932 | Hebig | 226—88 |
| 2,231,494 | 2/1941 | Dickinson. | |
| 2,726,859 | 12/1955 | Dolamore | 226—198 X |
| 2,916,546 | 12/1959 | Ginsberg et al. | |
| 3,011,152 | 11/1961 | Eckdahl. | |
| 3,095,473 | 6/1963 | Roizen. | |
| 3,216,132 | 11/1965 | Flaherty | 35—48 |
| 3,212,203 | 10/1965 | Atkinson | 35—48 |
| 3,199,079 | 8/1965 | Kuhne | 340—146.3 |
| 2,944,734 | 7/1960 | Martin | 235—61.7 |
| 2,010,653 | 8/1935 | Warren | 235—92 |

FOREIGN PATENTS 286,460  3/1928  Great Britain.

MAYNARD R. WILBUR, *Primary Examiner.*

T. J. SLOYAN, *Assistant Examiner.*